(12) United States Patent
Sato et al.

(10) Patent No.: US 9,679,391 B2
(45) Date of Patent: Jun. 13, 2017

(54) IMAGE PICKUP SYSTEM AND IMAGE PICKUP METHOD

(71) Applicant: Olympus Corporation, Hachioji-shi, Tokyo (JP)

(72) Inventors: Akinobu Sato, Hachioji (JP); Saori Matsumoto, Hino (JP); Koji Sakai, Mitaka (JP); Hiroki Amino, Akiruno (JP); Kensuke Ishii, Tokyo (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1 day.

(21) Appl. No.: 14/748,395

(22) Filed: Jun. 24, 2015

(65) Prior Publication Data

US 2015/0381879 A1    Dec. 31, 2015

(30) Foreign Application Priority Data

Jun. 25, 2014    (JP) ................................. 2014-130623

(51) Int. Cl.
*G06T 7/20* (2006.01)
*H04N 5/232* (2006.01)

(52) U.S. Cl.
CPC ........... *G06T 7/20* (2013.01); *H04N 5/23203* (2013.01); *H04N 5/23209* (2013.01)

(58) Field of Classification Search
CPC ........... H04N 5/23203; H04N 5/23209; H04N 5/232; G06T 7/20
See application file for complete search history.

(56) References Cited

U.S. PATENT DOCUMENTS

| | | | |
|---|---|---|---|
| 8,903,568 B1* | 12/2014 | Wang ..................... | B64C 19/00 244/189 |
| 2014/0198220 A1* | 7/2014 | Nakamura ......... | H04N 5/23203 348/169 |
| 2015/0049206 A1* | 2/2015 | Eshita .................. | H04N 5/2251 348/207.11 |
| 2015/0236922 A1* | 8/2015 | Xiong ..................... | H04L 41/22 715/748 |

FOREIGN PATENT DOCUMENTS

| | | | |
|---|---|---|---|
| JP | 2010-148052 | 7/2010 | |
| WO | WO 2014/043918 | * 3/2014 | ............. H04L 41/22 |

* cited by examiner

*Primary Examiner* — Christopher K Peterson
(74) *Attorney, Agent, or Firm* — John C. Pokotylo; Straub & Pokotylo

(57) ABSTRACT

An image pickup system is an image pickup system in which an image pickup section and a confirmation section that displays a picked-up image from the image pickup section are separable, the image pickup system including: a first motion determination section that determines a motion of the image pickup section; a second motion determination section that determines a motion of the confirmation section; and a control section that controls at least one of the image pickup section and the confirmation section by obtaining a relationship between the motion of the image pickup section and the motion of the confirmation section based on determination results of the first and second motion determination sections.

13 Claims, 16 Drawing Sheets

FIG. 4A

|  |  | IMAGE PICKUP SECTION | |
|---|---|---|---|
|  |  | STOP | MOVE |
| CONFIRMATION SECTION | STOP | — | COMPOSITION SETTLEMENT |
|  | MOVE | • IMAGE CAPTURE<br>• ZOOM<br>• EXPOSURE CONTROL | — |

FIG. 4B

|  |  | IMAGE PICKUP SECTION | |
|---|---|---|---|
|  |  | STOP | MOVE |
| CONFIRMATION SECTION | STOP | — | COMPOSITION SETTLEMENT<br>AFTER 1 SECOND → EXPOSURE CONTROL |
|  | MOVE |  | — |

LENS-STYLE CAMERA

SMARTPHONE

T1　T2　T3　T4　T5　T6

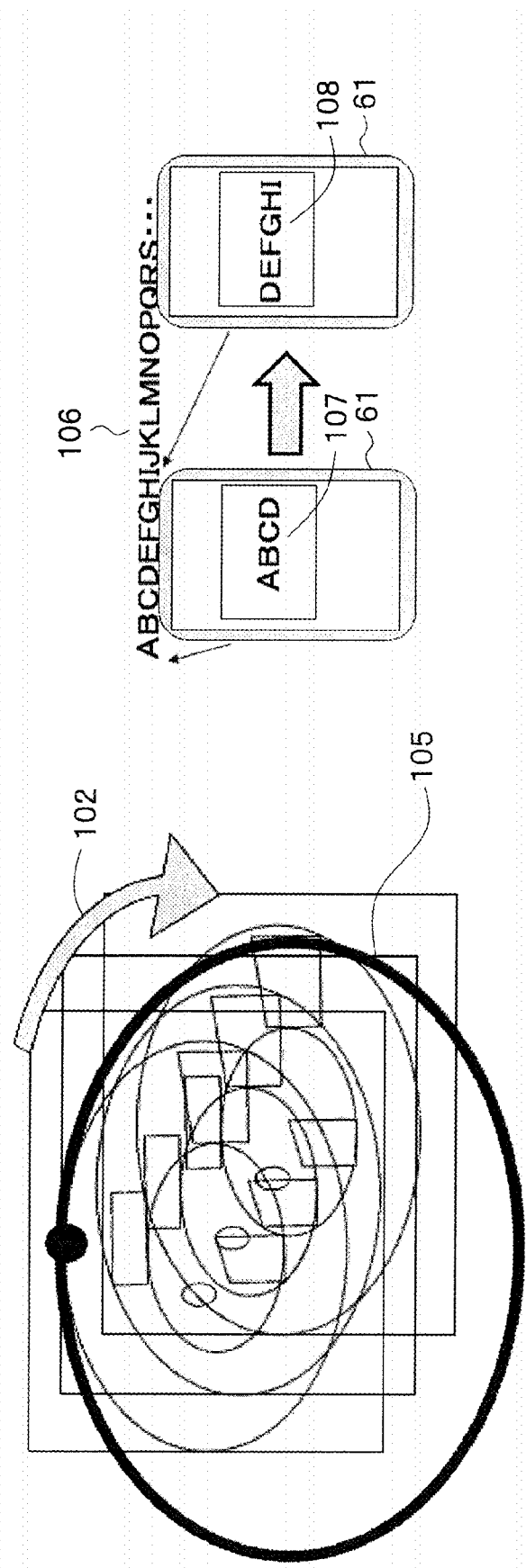

IMAGE PICKUP SYSTEM AND IMAGE PICKUP METHOD

CROSS REFERENCE TO RELATED APPLICATION

This application claim is benefit of Japanese Application No. 2014-130623 in Japan on Jun. 25, 2014, the contents of which are incorporated by this reference.

BACKGROUND OF THE INVENTION

1. Field of the Invention

The present invention relates to an image pickup system having a confirmation section capable of displaying an image from a separated image pickup section, and an image pickup method.

2. Description of the Related Art

Recently, portable devices (shooting devices) with a shooting function, such as digital cameras, are popular. Some of this type of shooting device have a display section, and have a function to display a shot image. Also, in some of the shooting devices, a menu screen is displayed on the display section so as to facilitate operation of the shooting device. Since the display section as described above is provided on a back surface of a portable device body in most cases, a user can perform a shooting operation while confirming a through image displayed on the display section on the back surface at the time of shooting.

Also, recently, lens-style cameras provided only with shooting and recording functions without having a display section for a picked-up image are sometimes employed. This type of lens-style camera is generally attached to a smartphone or a tablet PC etc., and shooting is controlled by employing the smartphone or the tablet PC etc., to which the camera is attached, as an operation device (a control device). The control device such as the smartphone and the tablet PC as described above also functions as an image pickup display apparatus that displays a picked-up image from the lens-style camera.

The lens-style camera is freely attached to and detached from the smartphone or the tablet PC etc., and can also perform shooting in a state detached from the smartphone or the tablet PC etc. In this case, the control device such as the smartphone and the tablet PC is connected to the lens-style camera via wireless or wired communication. The lens-style camera can perform a shooting operation by using a touch panel or the like provided on a display section.

The lens-style camera is considered to be used in a state mounted to the image pickup display apparatus that displays a picked-up image from the lens-style camera (a connected state), and in a state detached from the image pickup display apparatus (a separated state). In the separated state, there is an advantage that a degree of compositional freedom is increased as compared to that in the connected state.

Japanese Patent Application Laid-Open Publication No. 2010-148052 discloses a technique of controlling shooting by a facial expression by including an expression discrimination engine that discriminates an expression of a face image included in a picked-up image by an in-camera, and a CPU that stores image information from an out-camera in a memory based on discrimination information from the expression discrimination engine.

SUMMARY OF THE INVENTION

An image pickup system according to the present invention is an image pickup system in which an image pickup section and a confirmation section that displays a picked-up image from the image pickup section are separable, the image pickup system including: a first motion determination section that determines a motion of the image pickup section; a second motion determination section that determines a motion of the confirmation section; and a control section that controls at least one of the image pickup section and the confirmation section by obtaining a relationship between the motion of the image pickup section and the motion of the confirmation section based on determination results of the first and second motion determination sections.

Also, an image pickup system according to the present invention includes: an image pickup section that picks up an image of an object; a confirmation section that is separate from the image pickup section and confirms a result of the image pickup; a composition deciding operation determination section that determines a composition deciding operation by motion information of each of the image pickup section and the confirmation section; and an operation determination section that determines a particular motion of the confirmation section as an operation of changing an image pickup parameter when the image pickup section is substantially fixed after the composition deciding operation is determined Also, an image pickup method according to the present invention includes: an image pickup step of picking up an image of an object by an image pickup section; a confirmation step of confirming a result of the image pickup by a confirmation section that is separate from the image pickup section; a composition deciding operation determination step of determining a composition deciding operation by motion information of each of an image pickup section and a confirmation section; and an operation determination step of determining a particular motion of the confirmation section as an operation of changing an image pickup parameter when the image pickup section is substantially fixed after the composition deciding operation is determined.

The above and other objects, features and advantages of the invention will become more clearly understood from the following description referring to the accompanying drawings.

BRIEF DESCRIPTION OF THE DRAWINGS

FIGS. 4A and 4B are tables illustrating examples of an operation aspect corresponding to a relationship between respective states of an image pickup section and a confirmation section, or a change thereof;

FIGS. 15A to 15E are explanatory views for explaining the shooting control corresponding to FIGS. 12 and 13.

DETAILED DESCRIPTION OF THE PREFERRED EMBODIMENTS

In the following, embodiments of the present invention will be described in detail with reference to the drawings.

First Embodiment

Figure 1:
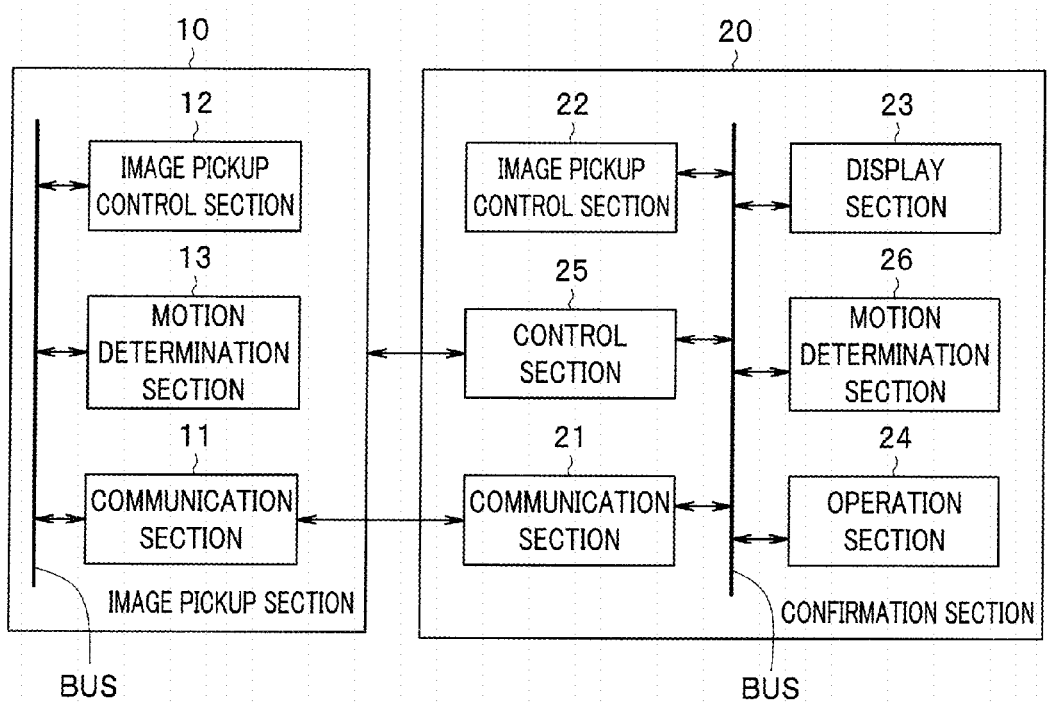
FIG. 1 is a block diagram illustrating a shooting system according to a first embodiment of the present invention.

FIG. 1 is a block diagram illustrating a shooting system according to a first embodiment of the present invention.

In FIG. 1, an image pickup section 10 has a communication section 11, and a confirmation section 20 has a communication section 21. For example, the image pickup section 10 can be composed of a lens-style camera, and the confirmation section 20 can be composed of a smartphone or a tablet PC. The communication section 11 and the communication section 21 can communicate with each other. The image pickup section 10 and the confirmation section 20 can transmit and receive various information by communicating with each other via the communication sections 11 and 21. Note that the confirmation section 20 composed of a smartphone or a tablet PC etc. not only performs display so as to confirm an image from the image pickup section 10, but also operates and controls the image pickup section 10, and thus, the confirmation section 20 may be expressed as an "information terminal", an "image pickup display apparatus", an "operation apparatus", a "control apparatus", or the like.

The image pickup section 10 has an image pickup device (not shown). An image pickup control section 12 can control image pickup by the image pickup device by a control signal given from the confirmation section 20 via the communication section 11. The communication section 11 can transmit a picked-up image acquired by the image pickup device to the communication section 21.

In the present embodiment, the image pickup section 10 is provided with a motion determination section 13. The motion determination section 13 can determine a motion of the image pickup section 10 and output a determination result to a control section 25 of the confirmation section 20 via the communication section 11. Note that the motion determination section 13 is composed of an acceleration sensor or a gyro sensor etc., and can determine the motion of the image pickup section 10 based on detection results of the sensors. The motion determination section 13 may also determine the motion of the image pickup section 10 by detecting a motion of the picked-up image obtained by the image pickup device of the image pickup section 10. Note that the image pickup control section 12, the communication section 11, and the motion determination section 13 are connected to each other via a bus.

The confirmation section 20 has an image pickup device (not shown). An image pickup control section 22 can control image pickup by the image pickup device of the confirmation section 20. The confirmation section 20 has a display section 23. The display section 23 is controlled by the control section 25 to display a picked-up image, a menu, or the like.

The control section 25 can control the image pickup by the image pickup section 10 via the communication sections 21 and 11. The control section 25 can also give the picked-up image transferred from the image pickup section 10 via the communication sections 11 and 21 to the display section 23 and display the picked-up image thereon after applying predetermined image processing to the picked-up image.

The confirmation section 20 is provided with an operation section 24. The operation section 24 can be composed of a switch or a button etc. (not shown), and outputs an operation signal based on a user operation for the operation section 24 to the control section 25. A touch panel (not shown) disposed on a display screen of the display section 23 may be also employed as the operation section 24.

The touch panel can generate an operation signal according to a position on the display screen of the display section 23 indicated by a user's finger. The operation signal is supplied to the control section 25. Accordingly, when a user touches or slides his/her finger on the display screen, the control section 25 can detect various operations such as a position touched by the user, an operation of closing and separating fingers (a pinch operation), a slide operation or a position reached by the slide operation, a slide direction, and a touch period. The control section 25 can execute processing corresponding to the user operation. For example, various shooting operations in the image pickup section 10 can be performed by the touch operation.

In the present embodiment, the confirmation section 20 is provided with a motion determination section 26. The motion determination section 26 can determine a motion of the confirmation section 20 itself. The motion determination section 26 outputs a determination result of the motion to the control section 25. Note that the motion determination section 26 is composed of an acceleration sensor or a gyro sensor etc., and can determine the motion of the confirmation section 20 based on detection results of the sensors. The motion determination section 26 may also determine the motion of the confirmation section 20 by detecting a motion of a picked-up image obtained by the image pickup device of the confirmation section 20. Note that the communication section 21, the image pickup control section 22, the display section 23, the operation section 24, the control section 25, and the motion determination section 26 are connected to each other via a bus.

Note that the motion determination sections 13 and 26 can determine various motions such as whether the image pickup section 10 and the confirmation section 20 are moving or stationary, a type of the motion, e.g., whether the motion is an arc motion, a square motion, a motion surrounding a region, or a linear motion, a rotation angle, a motion amount, and a motion speed.

The control section 25 can not only control the confirmation section 20 and the image pickup section 10 based on the operation of the operation section 24, but can also control the confirmation section 20 and the image pickup section 10 according to the determination results of the motion determination sections 13 and 26. Note that the control section 25 stores the motion determination results of the motion determination sections 13 and 26 in a memory (not shown). Accordingly, the control section 25 can control the image pickup section 10 and the confirmation section 20 according to a history of the motion determination.

Figure 2:
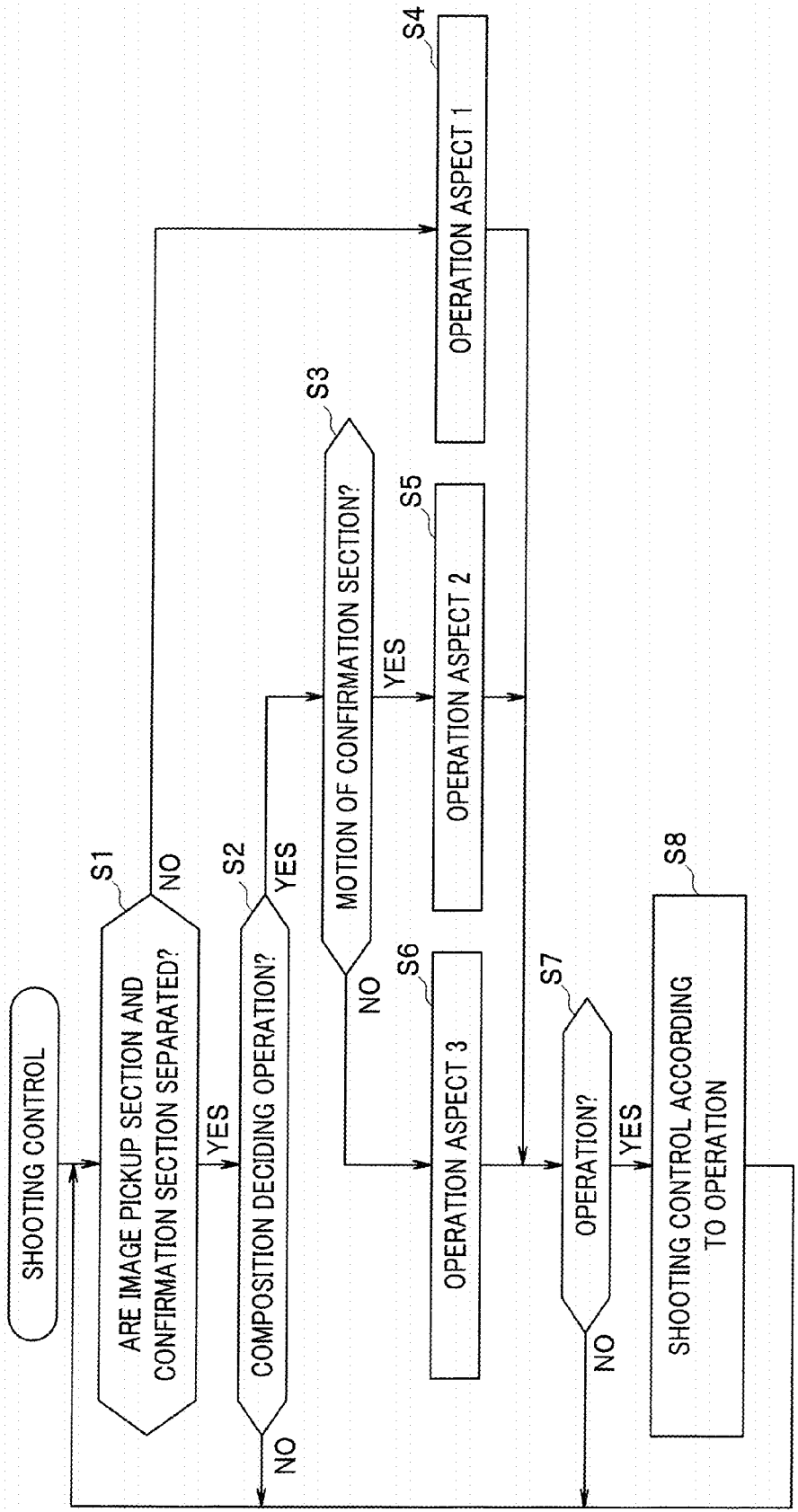
FIG. 2 is a flowchart for explaining shooting control.
Figure 3C:
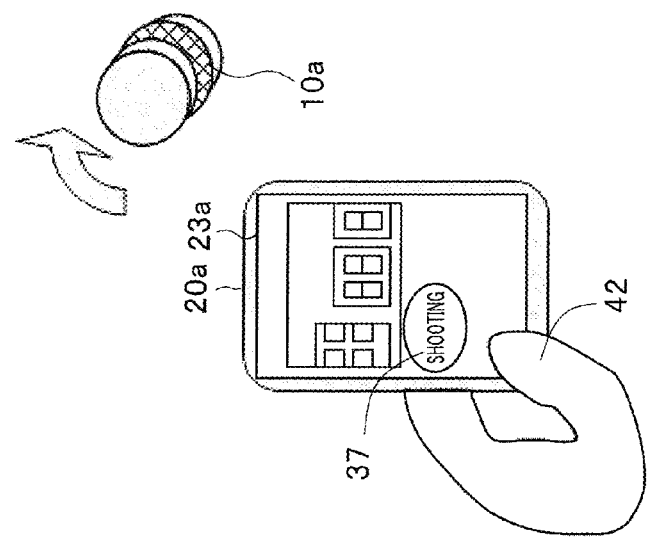
FIGS. 3A to 3C are explanatory views for explaining an action of the first embodiment.
Figure 3B:
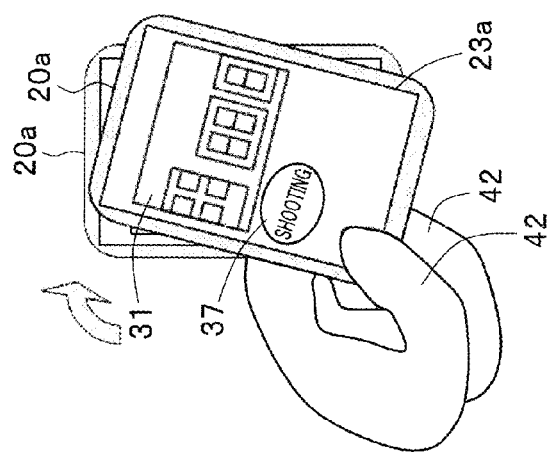

Next, an action of the embodiment having the above configuration will be described with reference to FIGS. 2 and 3A to 3C. FIG. 2 is a flowchart for explaining shooting control, and FIGS. 3A to 3C are explanatory views for explaining the action of the first embodiment.

The control section 25 of the confirmation section 20 controls the image pickup control section 12 of the image pickup section 10 via the communication sections 21 and 11. The image pickup control section 12 is controlled by the control section 25 to drive the image pickup device of the image pickup section 10. A picked-up image picked up and obtained by the image pickup device is captured into the confirmation section 20 via the communication sections 11 and 21. The control section 25 of the confirmation section 20 gives the captured picked-up image to the display section 23, and displays a through image thereon after applying predetermined signal processing to the picked-up image. A user can perform a shooting operation while referring to the through image displayed on the display section 23.

In the present embodiment, the shooting operation is performed not only by the operation of the operation section 24, but also by moving the image pickup section 10 and the confirmation section 20 in association. In step S1 in FIG. 2, it is determined whether or not the image pickup section 10 and the confirmation section 20 are separated. For example, the control section 25 can determine whether or not the confirmation section 20 and the image pickup section 10 are separated based on the motion determination results of the motion determination sections 13 and 26. When the image pickup section 10 is attached to the confirmation section 20, that is, when the image pickup section 10 and the confirmation section 20 are in a connected state, the control section 25 performs a display form and operation control in an operation aspect 1 (step S4).

Figure 3A:
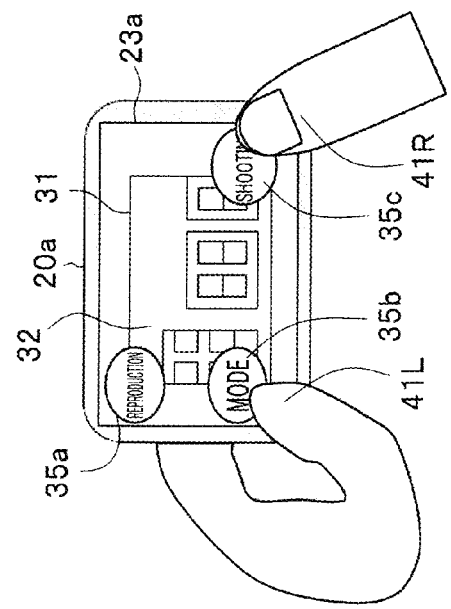

FIG. 3A shows the display in the operation aspect 1. FIG. 3A shows a state in which the display section 23 is provided over a substantially entire region of an operation surface of a housing 20a of the confirmation section 20. An image display region 31 that displays a picked-up image 32 is provided on a display screen 23a of the display section 23. A reproduction button 35a, a mode button 35b, and a shooting button 35c, which are operation icons constituting the operation section 24, are also displayed on the display screen 23a.

When a user touches the reproduction button 35a, the mode button 35b, or the shooting button 35c, the control section 25 shifts the confirmation section 20 into a reproduction mode, a mode setting mode, or a shooting mode.

When the image pickup section 10 is attached to the confirmation section 20, it is considered that a user grips the housing 20a with both hands in most cases. The user performs a touch operation by using both of a finger 41L of his/her left hand and a finger 41R of his/her right hand (for example, thumbs) as shown in an example in FIG. 3A. Since the operation using the fingers of the both hands is possible, the operation icons are arranged in arrangement regions of respective top, bottom, right, and left portions on the display screen 23a as shown in FIG. 3A.

When determining that the image pickup section 10 and the confirmation section 20 are in a separated state, the control section 25 determines whether or not a composition deciding operation is being performed in next step S2. For example, the control section 25 determines whether or not the image pickup section 10 is performing a particular movement in a state in which a photographer views the confirmation section 20. For example, it is assumed that the photographer grips and holds the image pickup section 10 with one of his/her hands, and grips the confirmation section 20 with the other of his/her hands to confirm the display section 23. In this case, the photographer moves the image pickup section 10 in order to decide a composition. For example, when detecting that the confirmation section 20 is in a stationary state, and the image pickup section 10 moves for deciding the composition and becomes stationary for a predetermined period after the movement based on the determination results of the motion determination sections 13 and 26, the control section 25 determines that the composition deciding operation is terminated, and a composition settled state is obtained. Note that whether the photographer views the confirmation section 20 can be easily confirmed if the confirmation section 20 has an in-camera. When the confirmation section 20 does not have the in-camera or the like, the determination on whether the photographer views the confirmation section 20 may be omitted, and the composition deciding operation and the composition settled state may be determined only by a relationship between the motions of the image pickup section 10 and the confirmation section 20. The composition deciding operation is determined by the motion of the confirmation section 20 and the motion of the image pickup section 10.

As a condition of the motion of the confirmation section 20, a state in which a relationship between the confirmation section 20 and the user is substantially fixed is employed as the condition by directly determining, for example, that the confirmation section 20 is within a distance of distinct vision from user's eyes, and top, bottom, right and left sides are kept at fixed locations with respect to the user's eyes by using an image. Alternatively, a state in which the confirmation section 20 is fixed within a range of image stabilization may be employed as the condition (however, for example, a state in which the confirmation section 20 is laid down on a desk may not be employed as the condition). These conditions may be employed as the condition on the confirmation section 20-side.

A condition of the motion of the image pickup section 10 may be also taken into consideration. In this case, whether a hesitation operation described below and a confirmation operation are performed may be determined In the composition deciding operation, the confirmation section 20 is almost fixed such that the user can view the confirmation section 20 well, and confirmation and hesitation (correction of the composition) are being performed in the image pickup section 10.

Also, at the time of the composition deciding operation, a motion for capturing an object image is first performed. First of all, there is a state in which an object to be caught in a screen center portion is unfixed. No object is continuously detected in the screen first. After that, an image of a particular object is picked up, and the user tries to continuously capture the object. That is, a period until a particular object enters the screen may be considered as a part of the composition deciding operation.

Subsequently, it is considered that a motion is performed in which the user repetitively performs confirmation for confirming the composition and a shooting effect, and feedback operation with respect to the object image entering, for example, the center portion of the screen. In a case in which an image of a same feature is first captured, and there is a confirmation period of about 0.5 seconds (this numerical value is provisionally employed because it is said that it takes 0.4 seconds until a ball reaches a home plate after a baseball pitcher pitches the ball, and an expert can determine a type of pitch during the time, but there is of course a difference among individuals) for confirming the image, the motion is considered as a "hesitating motion". It is assumed that none of the confirmation section 20 and the image pickup section 10 is moved during the confirmation period. In this case, a motion pattern in which a slight movement and a stop are repeated in a cycle of about 0.5 to 2 seconds is determined by a change in an image pickup result, posture determination, vibration determination or the like, and this determination may be employed as "motion determination". A method of the "motion determination" will be described in more detail later. Not the center of the screen, but a particular region may be determined At this time, whether the photographer surely views the confirmation section 20, or whether the photographer tries not to shake the confirmation section 20 may be employed as the determination condition at a same time.

First, the invention is featured in that the "composition deciding operation" is determined by motion information of each of the image pickup section 10 and the confirmation section 20, and a user's intention is read from analysis of motion data by assuming that the user wants to perform a next operation when the image pickup section 10 is fixed after the "composition deciding operation" is determined as described above.

When determining that the composition settled state is obtained, the control section 25 determines the motion of the confirmation section 20 in next step S3. In the present embodiment, when the confirmation section 20 moves in a state in which the image pickup section 10 is stationary in the composition settled state, operation control in an operation aspect 2 is performed according to the motion of the confirmation section 20 (step S5). For example, when the user performs an operation of rotating the confirmation section 20 in the composition settled state, the control section 25 determines that the operation is a zoom operation, and performs zoom control on the image pickup section 10 via the communication sections 21 and 11.

FIG. 3B shows a state of the operation aspect 2. FIG. 3B shows a state in which the housing 20a is moving by doubly illustrating the housing 20a of the confirmation section 20 and a hand 42 of the user. A shooting button 37, which is an operation icon, is displayed in a region other than the image display region 31 on the display screen 23a. When the photographer rotates the confirmation section 20 as indicated by an arrow in FIG. 3B, the control section 25 determines that the motion is a zoom operation. In this case, the control section 25 may determine a zoom direction by a rotation direction and a zoom amount by a rotation angle. Also, as the operation indicating zoom, an operation of rotationally moving the housing 20a while switching a rotation direction between forward and reverse directions may be performed. In this case, the control section 25 may determine a zoom direction by a direction in which the housing 20a is first rotated a predetermined amount or more, and determine a zoom amount by the number of times of forward and reverse rotation.

Note that when the user touches the shooting button 37, the control section 25 records the captured picked-up image.

In a case of the display form, it is considered that the user grips the housing 20a with one hand, and grips the image pickup section 10 with one hand in most cases, and it is relatively difficult for the user to perform a shooting operation using a button or a switch etc. Even in this case, it is relatively easy to perform the operation of moving the confirmation section 20, so that the user can easily perform the zoom operation as in an example in FIG. 3B.

Also, in the present embodiment, the image pickup section 10 and the confirmation section 20 can be configured to be controllable by moving the image pickup section 10 in the composition settled state. In a case in which the motion corresponding to the operation control is not generated in the confirmation section 20 in step S3, the control section 25 proceeds to step S6, and performs operation control in an operation aspect 3 according to the motion of the image pickup section 10.

FIG. 3C shows a state of the operation aspect 3. FIG. 3C shows a state in which the user is rotating a housing 10a of the image pickup section 10 in a state in which the motion of the confirmation section 20 is stopped. When the photographer rotates the image pickup section 10 as indicated by an arrow in FIG. 3C, the control section 25 determines that the motion is a zoom operation. In this case, the control section 25 may determine a zoom direction by a rotation direction and a zoom amount by a rotation angle. Also, as the operation indicating zoom, an operation of rotationally moving the housing 10a while switching a rotation direction between forward and reverse directions may be performed. In this case, the control section 25 may determine a zoom direction by a direction in which the housing 10a is first rotated a predetermined amount or more, and determine a zoom amount by the number of times of forward and reverse rotation.

Since the image pickup section 10 and the confirmation section 20 are separable, the image pickup section 10 and the confirmation section 20 are considered to be separately used because of a high degree of freedom of composition decision. In this case, however, when the user grips the image pickup section 10 and the confirmation section 20 with the right and left hands, it is difficult to perform a relatively fine operation such as a switch operation. Even in this case, as a method of enabling an easy and instinctive operation with the gripping hands, the device motion itself is used for the operation by providing the motion determination sections 13 and 26. Accordingly, it is possible to perform shooting with an improved degree of freedom of composition decision by separating the image pickup section 10 and the confirmation section 20 without deteriorating operability.

When detecting an operation on the display according to the operation aspects 1 to 3 in step S7, the control section 25 performs shooting control, image processing, or the like according to the operation (step S8).

Note that the operation aspects shown in FIGS. 3A to 3C are merely illustrative, and it is possible to set various operation aspects according to the states of the confirmation section 20 and the image pickup section 10.

The control section 25 may also perform shooting processing, image processing, or the like based on the operation after capturing the picked-up image of the image pickup section 10 as a still image and storing the image in the memory at the time when the composition is settled, or may perform the processing in a state of a through image. In this case, the picked-up image of the image pickup section 10 may be recorded as a still image by a touch operation of the shooting button 37 shown in FIGS. 3B and 3C, or may be recorded as a still image by detecting, for example, that both of the image pickup section 10 and the confirmation section 20 remain stationary for a predetermined period or more.

Also, although a point in which a history of the motions of the image pickup section 10 and the confirmation section 20 is used is not clearly shown in the flowchart in FIG. 2 described above, the operation aspect may be determined according to not only the relationship between the present motion states of the image pickup section 10 and the confirmation section 20, but also the history of the motions of the image pickup section 10 and the confirmation section 20.

For example, FIGS. 4A and 4B are tables illustrating examples of the operation aspect corresponding to the relationship between the respective states of the image pickup section and the confirmation section, or a change thereof. FIG. 4A shows an example in which the operation aspect is decided only by the relationship between the present motion states, and FIG. 4B shows an example in which the operation aspect is decided based on the history of the motions.

FIG. 4A shows that the control section 25 determines that an operation is for a composition deciding process when the confirmation section 20 is in a stationary state and the image pickup section 10 is moving. FIG. 4A also shows that the control section 25 determines that an operation is for an image capture process, a zoom process, or an exposure control process according to a motion type when the image pickup section 10 is in a stationary state and the confirmation section 20 is moving.

Also, FIG. 4B shows that the control section 25 determines that an operation for a composition deciding process is being performed when the confirmation section 20 is in a stationary state and the image pickup section 10 is moving, and determines that an operation is, for example, for an exposure control process according to a motion type of the image pickup section 10 when the image pickup section 10 is stationary, any motion is generated in the confirmation section 20, and the image pickup section 10 starts moving again after 1 second from when the image pickup section 10 becomes stationary.

Note that the control section 25 can perform control by using the determination results of various motions such as a motion of inclining the image pickup section 10 and the confirmation section 20 forward and backward, a motion of rotating the image pickup section 10 and the confirmation section 20 to the right and the left, and a motion of rotating the entire system as the type of the motion. The control section 25 can also determine a control direction and a control amount by a moving direction, a motion amount, the number of motion times, or the like.

Also, the examples in which the operation is determined according to the motion type when one of the image pickup section 10 and the confirmation section 20 is stationary and the other is moving are employed in FIGS. 4A and 4B in consideration of a point that it is relatively easy for the photographer to perform the operation. However, the operation may be determined by combining the motion type of one of the image pickup section 10 and the confirmation section 20, and the motion type of the other.

As described above, in the present embodiment, the shooting operation is determined based on the relationship between the motions of the image pickup section and the confirmation section or the history of the motions, and the user can easily perform the shooting operation even when the user grips the image pickup section and the confirmation section with the both hands. Accordingly, even when the image pickup section and the confirmation section are separately used, it is possible to improve the degree of freedom of composition decision while maintaining satisfactory operability.

Second Embodiment

Figure 5:
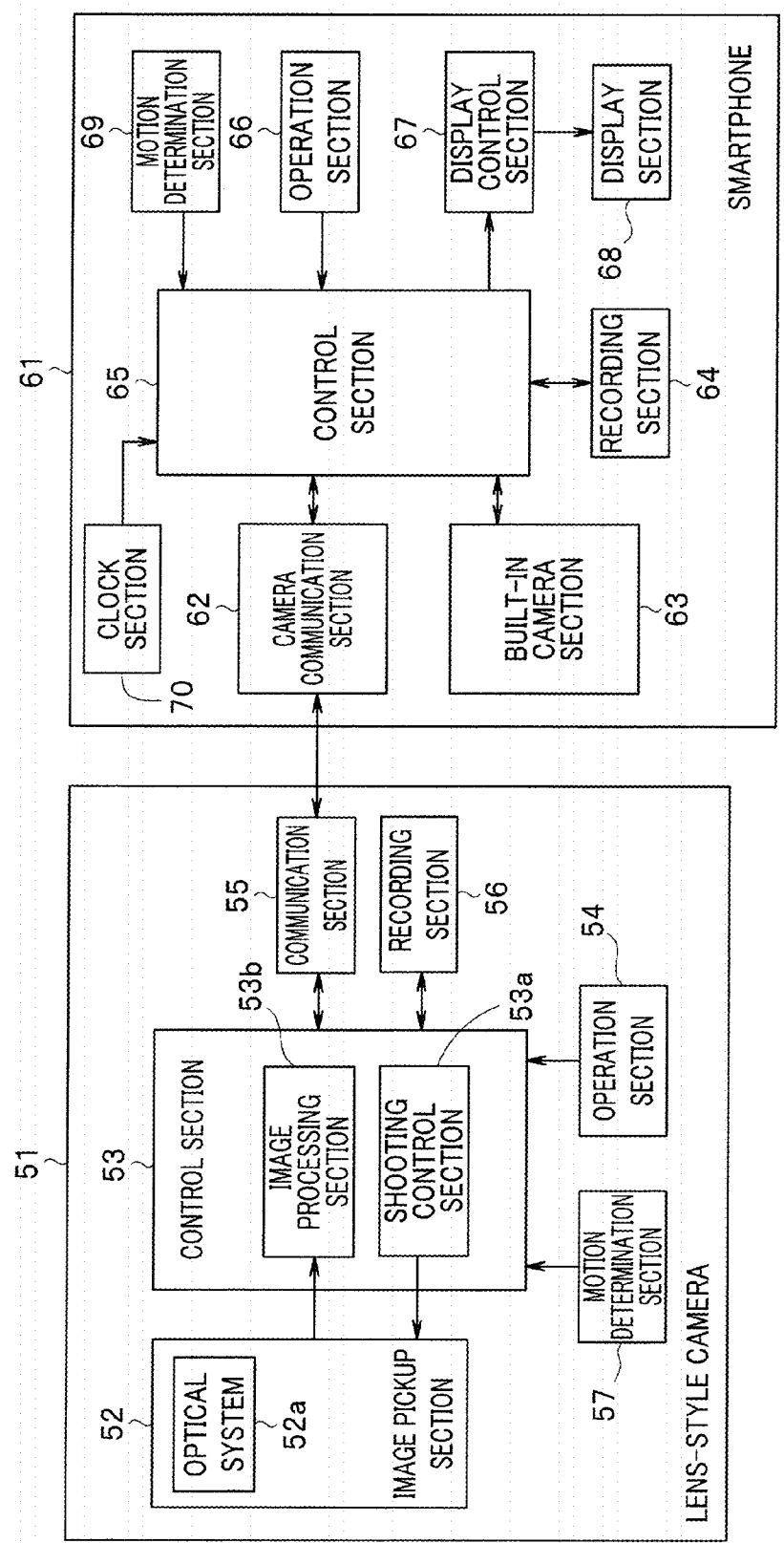
FIG. 5 is a block diagram illustrating a second embodiment of the present invention.
Figure 6:
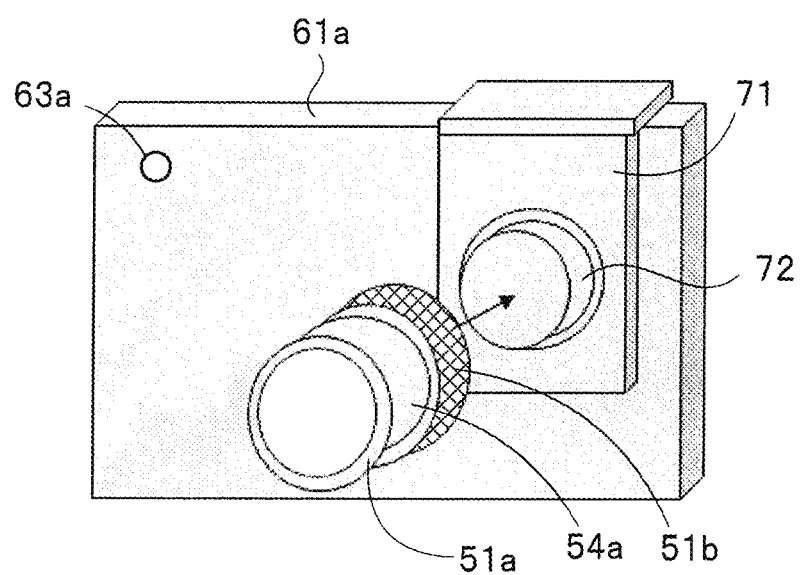
FIG. 6 is an explanatory view illustrating an appearance of FIG. 5.

FIG. 5 is a block diagram illustrating a second embodiment of the present invention, and shows an example in which a lens-style camera is employed as the image pickup section, and a smartphone is employed as the confirmation section. FIG. 6 is an explanatory view illustrating an appearance of FIG. 5. Note that the image pickup section and the confirmation section only need to have an image pickup function and a display function, respectively, and both of the image pickup section and the confirmation section may be composed of a smartphone, a tablet PC, or a mobile phone etc.

In FIG. 5, a smartphone 61 corresponding to the confirmation section 20 in FIG. 1 is provided with a camera communication section 62, and a lens-style camera 51 corresponding to the image pickup section 10 in FIG. 1 is provided with a communication section 55. The smartphone 61 and the lens-style camera 51 are configured to be able to communicate with each other via the communication sections 62 and 55.

As shown in FIG. 6, an attachment tool 71 is removably attached to a housing 61a of the smartphone 61, and an attachment section 72 to which the lens-style camera 51 is attached is provided in the attachment tool 71. An attachment section 5 lb is provided on a proximal end side of the lens-style camera 51. The attachment section 51b is configured to be attachable to the attachment section 72 of the attachment tool 71 by fitting or screwing.

The lens-style camera 51 is provided with an image pickup section 52 having an optical system 52a. The image pickup section 52 is provided with an image pickup device (not shown) composed of a CCD or CMOS sensor etc. An object image is guided to an image pickup surface of the image pickup device by the optical system 52a. The optical system 52a is accommodated in a lens barrel 51a. A focus lens that is moveable so as to be set to a focus state by focusing, a zoom lens that provides magnification in the focus state, or the like are provided in the lens barrel 51a. The optical system 52a also has a mechanism section (not shown) that drives the lenses and a diaphragm. A control section 53 controls the mechanism section of the optical system 52a to control the driving of the focus lens, the zoom lens, and the diaphragm.

The lens-style camera 51 is provided with an operation section 54 such as an operation ring 54a for an operation of setting a parameter regarding shooting by a user, e.g., a parameter regarding focus, zoom, and the diaphragm. The control section 53 detects a user operation for the operation section 54, and performs control based on a detection result. The control section 53 is composed of a CPU or the like, and controls respective sections of the lens-style camera 51 based on the user operation for the operation section 54 and a signal from the smartphone 61 described later.

A shooting control section 53a generates a focus signal, a zoom signal, and a diaphragm control signal to control the driving of the focus, the zoom, and the diaphragm of the optical system 52a. The shooting control section 53a also controls image pickup of an object by supplying a drive signal to the image pickup device.

An image processing section 53b is given a picked-up image from the image pickup device, and can give the picked-up image to a recording section 56 and record the picked-up image therein after applying predetermined image signal processing, e.g., color adjustment processing, matrix conversion processing, noise removal processing, and other various signal processing to the picked-up image. For example, an IC memory can be employed as the recording section 56. The image processing section 53b can also transfer the picked-up image to the smartphone 61 via the communication section 55.

The communication section 55 can communicate with the camera communication section 62 provided in the smartphone 61 via a predetermined transmission line. Various wired and wireless transmission lines, e.g., a transmission line employing a USB (universal serial bus) cable and a wireless LAN such as Wifi (wireless fidelity) can be employed as the transmission line. When the communication with the smartphone 61 is established, shooting can be controlled according to a control section 65 of the smartphone 61, and the control section 53 can transfer information regarding the picked-up image and the lens to the smartphone 61.

In the present embodiment, the lens-style camera 51 is provided with a motion determination section 57. The motion determination section 57 is composed of a triaxial acceleration sensor or a gyro sensor etc., and determines a motion of the lens-style camera 51 and gives a determination result to the control section 53. Note that a geomagnetic sensor may be also used as the motion determination section 57. Note that the motion determination section 57 may also determine the motion of the lens-style camera 51 by detecting a motion of the picked-up image obtained by the image pickup section 52.

The smartphone 61 has a built-in camera section 63. The built-in camera section 63 has two image pickup devices (not shown) each composed of a CCD or CMOS sensor etc. The two image pickup devices constitute an outer image pickup section and an inner image pickup section. The outer image pickup section picks up an image of an object when an optical image of the object incident through a lens 63*a* (see FIG. 6) provided on a front surface of the housing 61*a* of the smartphone 61 is guided to an image pickup surface of one of the image pickup devices. The inner image pickup section picks up an image of a photographer himself/herself when an optical image of the photographer himself/herself incident through a lens (not shown) provided on an operation surface of the housing 61*a* of the smartphone 61 is guided to an image pickup surface of the other of the image pickup devices.

The control section 65 of the smartphone 61 is composed of a processor such as a CPU, and controls respective sections of the smartphone 61. The control section 65 controls the built-in camera section 63, and outputs a signal for driving the image pickup section 52 of the lens-style camera 51. The control section 65 is given a picked-up image from the built-in camera section 63, and receives the picked-up image from the lens-style camera 51. The control section 65 applies predetermined signal processing, e.g., color adjustment processing, matrix conversion processing, noise removal processing, and other various signal processing to the picked-up image from the built-in camera section 63 and the received picked-up image.

An operation section 66 is also disposed in the smartphone 61. The operation section 66 is composed of various operation sections such as a switch, a key, and a software keyboard (not shown) provided in the smartphone 61. The operation section 66 generates an operation signal based on a user operation, and outputs the operation signal to the control section 65. The control section 65 controls the respective sections based on the operation signal.

The control section 65 can perform processing regarding recording and reproduction of the picked-up image. For example, the control section 65 can compress the picked-up image after the signal processing, give the compressed image to a recording section 64, and record the image therein. Various recording media such as an IC memory can be employed as the recording section 64, and the recording section 64 can record image information and audio information etc. in the recording medium.

A display control section 67 executes various processing regarding display. The display control section 67 is given the picked-up image after the signal processing from the control section 65, and can give the picked-up image to a display section 68. The display section 68 has a display screen such as an LCD, and displays the image given from the display control section 67. The display control section 67 can also display various menus or the like on the display screen of the display section 68. The control section 65 can read out and decompresses the picked-up image recorded in the recording section 64. The display control section 67 can reproduce the recorded image by giving the decompressed picked-up image to the display section 68.

A touch panel (not shown) is also provided as the operation section 66 on the display screen of the display section 68. The touch panel can generate an operation signal according to a position on the display screen indicated by a user's finger. The operation signal is supplied to the control section 65. Accordingly, when a user touches or slides his/her finger on the display screen, the control section 65 can detect various operations such as a position touched by the user, an operation of closing and separating fingers (a pinch operation), a slide operation or a position reached by the slide operation, a slide direction, and a touch period. The control section 65 can execute processing corresponding to the user operation.

Note that the display section 68 is disposed so as to occupy a substantially entire region of, for example, the operation surface of the smartphone 61. A user can confirm the picked-up image displayed on the display screen of the display section 68 at the time of shooting using the lens-style camera 51, and can perform a shooting operation while confirming the picked-up image.

Also, in the present embodiment, the smartphone 61 includes a motion determination section 69. The motion determination section 69 is composed of a triaxial acceleration sensor or a gyro sensor etc., and determines a motion of the smartphone 61 and gives a determination result to the control section 65. Note that a geomagnetic sensor may be also used as the motion determination section 69. Note that the motion determination section 69 may also determine the motion of the smartphone 61 by detecting a motion of the picked-up image obtained by the built-in camera section 63.

The control section 65 can determine the shooting operation based on information of the motion determination result from the motion determination section 69 and the motion determination result of the lens-style camera 51 received from the lens-style camera 51 via the camera communication section 62. That is, in the present embodiment, the control section 65 determines the shooting operation by a user not only by the operation of the operation section 66 of the smartphone 61, but also based on a relationship between the motions of the lens-style camera 51 and the smartphone 61 or a history of the motions by moving the lens-style camera 51 and the smartphone 61.

Figure 7:
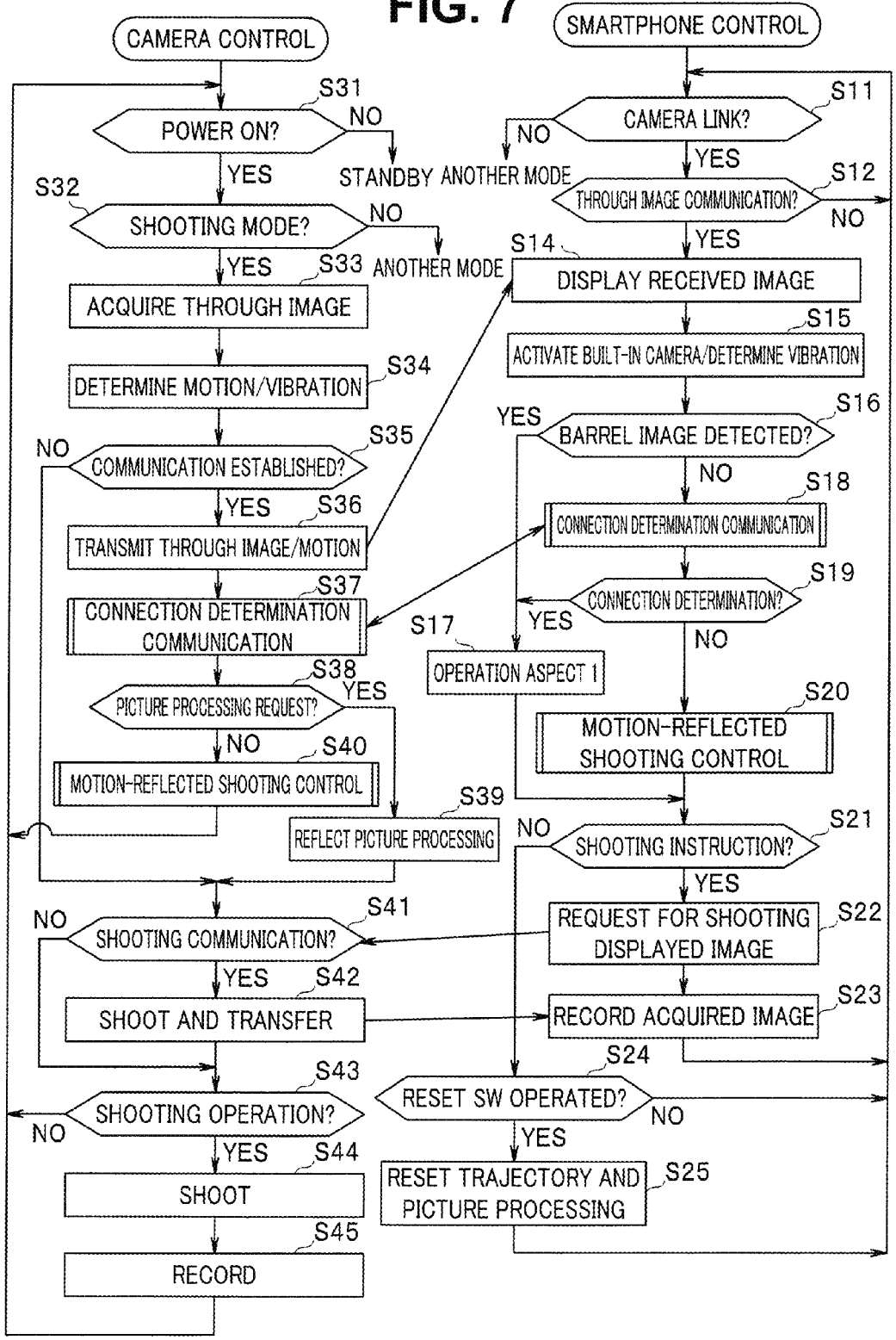
FIG. 7 is a flowchart for explaining camera control of a lens-style camera 51 and control of a smartphone 61.

Next, an action of the embodiment having the above configuration will be described with reference to FIGS. 7 to 16. FIG. 7 is a flowchart for explaining camera control of the lens-style camera 51 and control of the smartphone 61. Note that an arrow connecting a camera control flow of the lens-style camera 51 and a control flow of the smartphone 61 in FIG. 7 indicates that communication is performed by processing.

The control section 53 of the lens-style camera 51 determines whether or not power is turned ON in step S31. When power is turned ON, the control section 53 determines whether or not a shooting mode is specified (step S32). When the shooting mode is specified, the control section 53 controls the image pickup section 52 to pick up an image of an object. The picked-up image obtained by the image pickup section 52 is captured by the control section 53, and a through image is obtained (step S33). The control section 53 also acquires a motion determination result from the motion determination section 57 in step S34. Note that a determination result of vibration of the lens-style camera 51 is also obtained in step S34 for connection determination described later.

On the other hand, the control section 65 of the smartphone 61 determines whether or not a camera link mode is specified in step S11. When the camera link mode is specified, the control section 65 performs camera communication with the lens-style camera 51 and generates a request for receiving a through image from the lens-style camera 51 in step S12.

When receiving the request for a through image from the smartphone 61, the control section 53 of the lens-style camera 51 establishes communication in step S35, and thereafter transmits the through image to the smartphone 61 via the communication section 55 (step S36). Note that the motion determination result acquired in step S34 is also transmitted to the smartphone 61 in step S36. The control section 65 of the smartphone 61 receives the through image from the lens-style camera 51, gives the received through image to the display control section 67 to display the through image in step S14.

Subsequently, the control section 65 determines whether or not the smartphone 61 and the lens-style camera 51 are connected in order to determine a shooting operation. For example, the control section 65 activates the built-in camera section 63 and performs vibration determination using an output of the motion determination section 69 in step S15. The control section 65 then detects whether or not an image of a lens barrel constituting the lens-style camera 51 is included in a picked-up image from the built-in camera section 63 in step S16. When the barrel image is included, the control section 65 determines that the lens-style camera 51 is in a connected state, and sets the operation aspect 1 (step S17).

Figure 8:
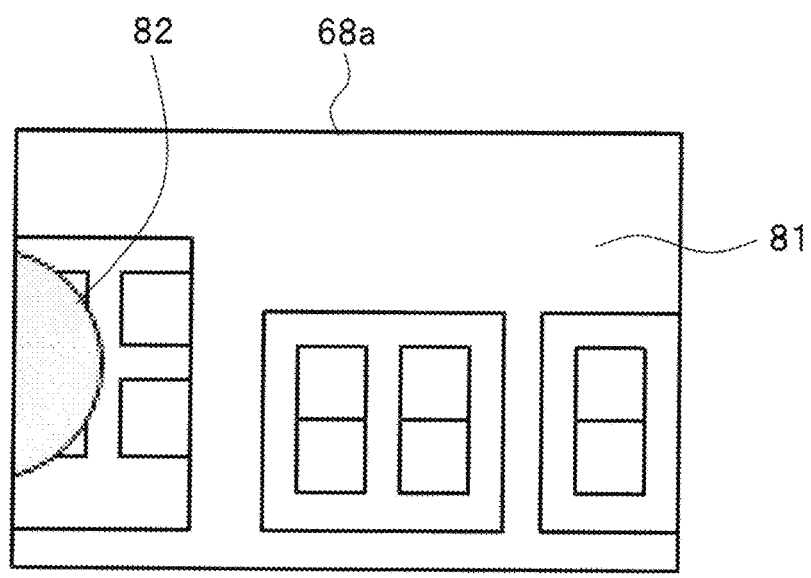
FIG. 8 is an explanatory view illustrating one example of a picked-up image from a built-in camera section 63.

FIG. 8 is an explanatory view illustrating one example of the picked-up image from the built-in camera section 63. FIG. 8 shows a state in which a picked-up image 81 acquired by the built-in camera section 63 is displayed on a display screen 68*a* of the display section 68. A barrel image 82 is included at an end portion of the picked-up image 81. An image of the lens barrel 51*a* of the lens-style camera 51 is sometimes picked up by the built-in camera section 63 depending on an attachment position of the lens-style camera 51, a position of the lens 63*a*, or the like. The control section 65 detects whether or not the barrel image 82 is included in the picked-up image by image processing. When the barrel image 82 is included, the control section 65 can determine that the lens-style camera 51 is mounted (connected) to the smartphone 61. Note that it is not necessary to perform display in FIG. 8 in the determination process.

Also, when the barrel image is not included in the picked-up image, the control section 65 cannot determine whether or not the lens-style camera 51 is in a connected state only by the picked-up image from the built-in camera section 63. Thus, the control section 65 performs communication for connection determination with the lens-style camera 51 in step S18. The lens-style camera 51 also performs communication for connection determination in step S37.

Figure 9:
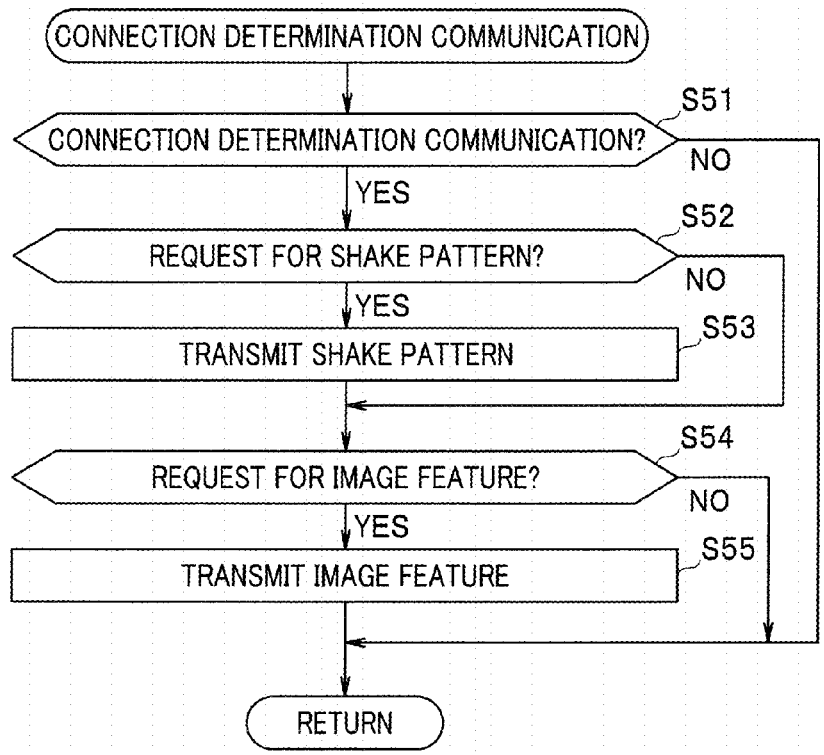
FIG. 9 is a flowchart illustrating one example of a specific action flow of connection determination communication of the lens-style camera 51 in step S37 in FIG. 7.

FIG. 9 is a flowchart illustrating one example of a specific action flow of the connection determination communication of the lens-style camera 51 in step S37 in FIG. 7. Also, FIG. 10 is a flowchart illustrating an example of a determination process of connection determination in step S19 in FIG. 7, and illustrating determination of the control section 65 using information obtained by the connection determination communication.

The control section 53 of the lens-style camera 51 determines whether or not a request for the connection determination communication is generated in step S51 in FIG. 9, and determines whether or not the request is a request for a shake pattern in step S52. When determining that the request for a shake pattern is generated, the control section 53 transmits information of the shake pattern, which is information of the vibration of the lens-style camera 51, based on an output of the motion determination section 57 (step S53).

Figure 10:
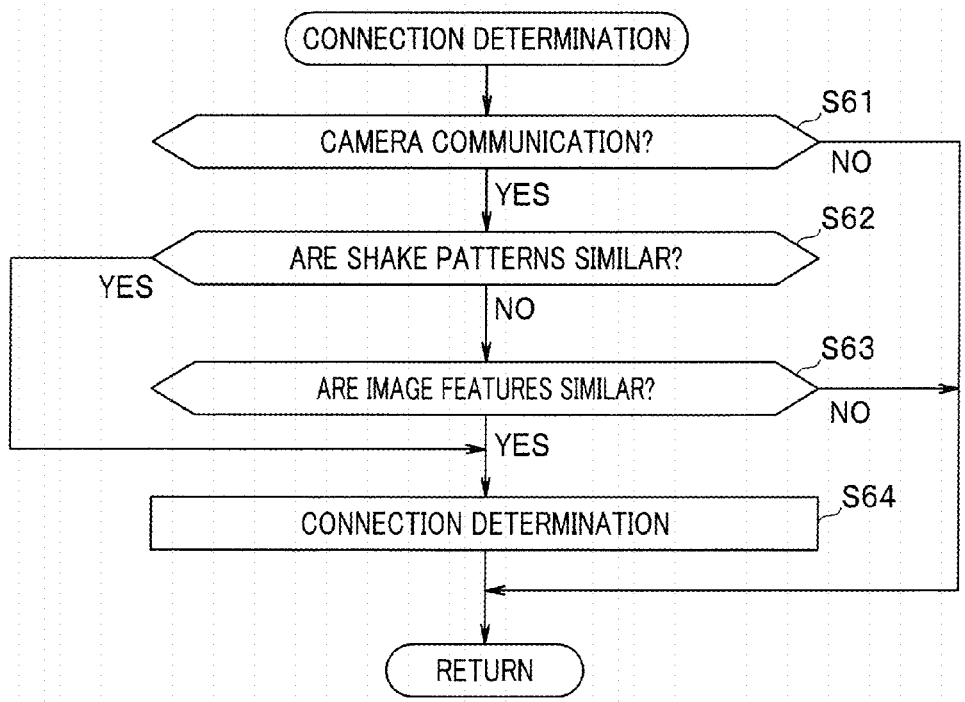
FIG. 10 is a flowchart illustrating determination of a control section 65 using information obtained by the connection determination communication.

On the other hand, the control section 65 of the smartphone 61 determines whether or not the camera communication with the lens-style camera 51 is performed, and receives the information of the shake pattern from the lens-style camera 51 in step S61 in FIG. 10. The control section 65 performs similarity determination between a result of the vibration determination (a shake pattern) of the smartphone 61 obtained in step S15 and the received shake pattern. When determining that the patterns are similar, the control section 65 advances the process to step S64. When determining that the patterns are not similar, the control section 65 advances the process to step S63.

Figure 11A:
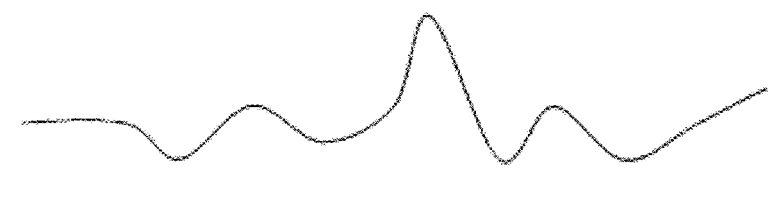
FIGS. 11A and 11B are explanatory views for explaining shake pattern similarity determination.
Figure 11B:

FIGS. 11A and 11B are explanatory views for explaining the similarity determination between the shake patterns. FIG. 11A shows the shake pattern of the lens-style camera 51, and FIG. 11B shows the shake pattern of the smartphone 61. The control section 65 obtains a change in a value of each shake pattern at each of, for example, timings T1, T2, and so on in FIGS. 11A and 11B. The control section 65 determines whether or not the changes are similar. When the changes in the two shake patterns are similar, the control section 65 determines that the lens-style camera 51 is connected to the housing 61*a* of the smartphone 61 (step S64). Also, when the changes in the two shake patterns are not similar, the control section 65 advances the process to step S63. The control section 65 requests transmission of an image feature of the picked-up image in the lens-style camera 51 in step S63.

The control section 53 of the lens-style camera 51 determines whether or not the request for an image feature is generated in step S54 in FIG. 9. When the request for an image feature is generated, the control section 53 transmits information of the image feature to the smartphone 61 in step S55.

When receiving the information of the image feature from the lens-style camera 51, the control section 65 determines similarity between the information of the image feature and information of an image feature obtained from the picked-up image acquired by the built-in camera section 63. When the information of the image feature and the information of the image feature are similar, the control section 65 determines that fields of view by the lens-style camera 51 and the built-in camera section 63 are similar, and the lens-style camera 51 is connected to the housing 61*a* of the smartphone 61 (step S64). Note that the control section 65 determines that the lens-style camera 51 is not connected to the housing 61a of the smartphone 61 when determining that the shake patterns are not similar and the image features are not similar.

When determining that the lens-style camera 51 is connected in step S19 in FIG. 7, the control section 65 advances the process to step S17 and sets the operation aspect 1. When determining that the lens-style camera 51 is not connected, the control section 65 advances the process to step S20. In the operation aspect 1 in step S17 in FIG. 7, for example, the display and the operation control shown in FIG. 3A are performed. On the other hand, in step S20, shooting control in which the motions of the lens-style camera 51 and the smartphone 61 are reflected is performed.

Figure 12:
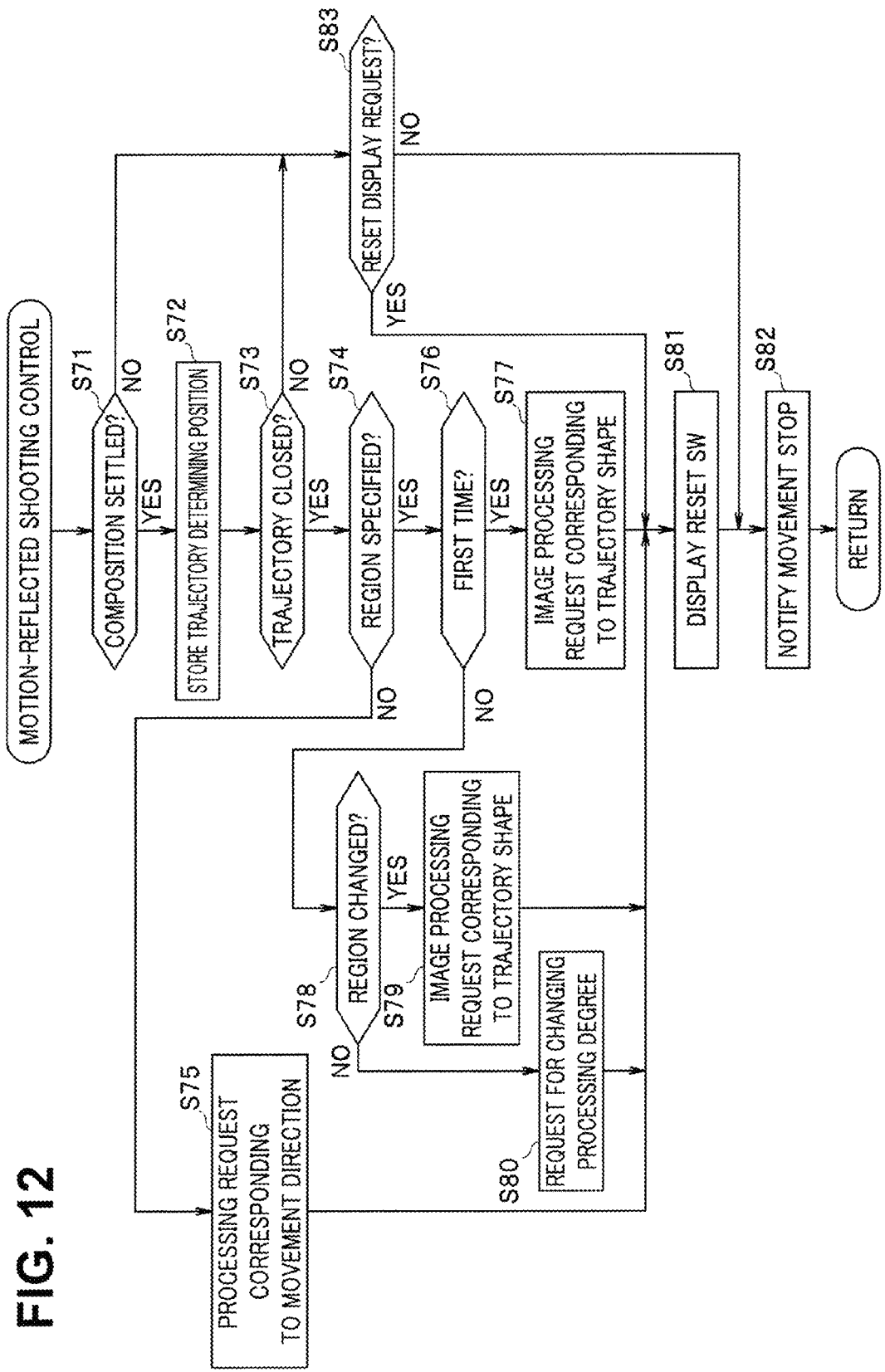
FIG. 12 is a flowchart illustrating an action of motion-reflected shooting control in step S20 in FIG. 7.
Figure 13:
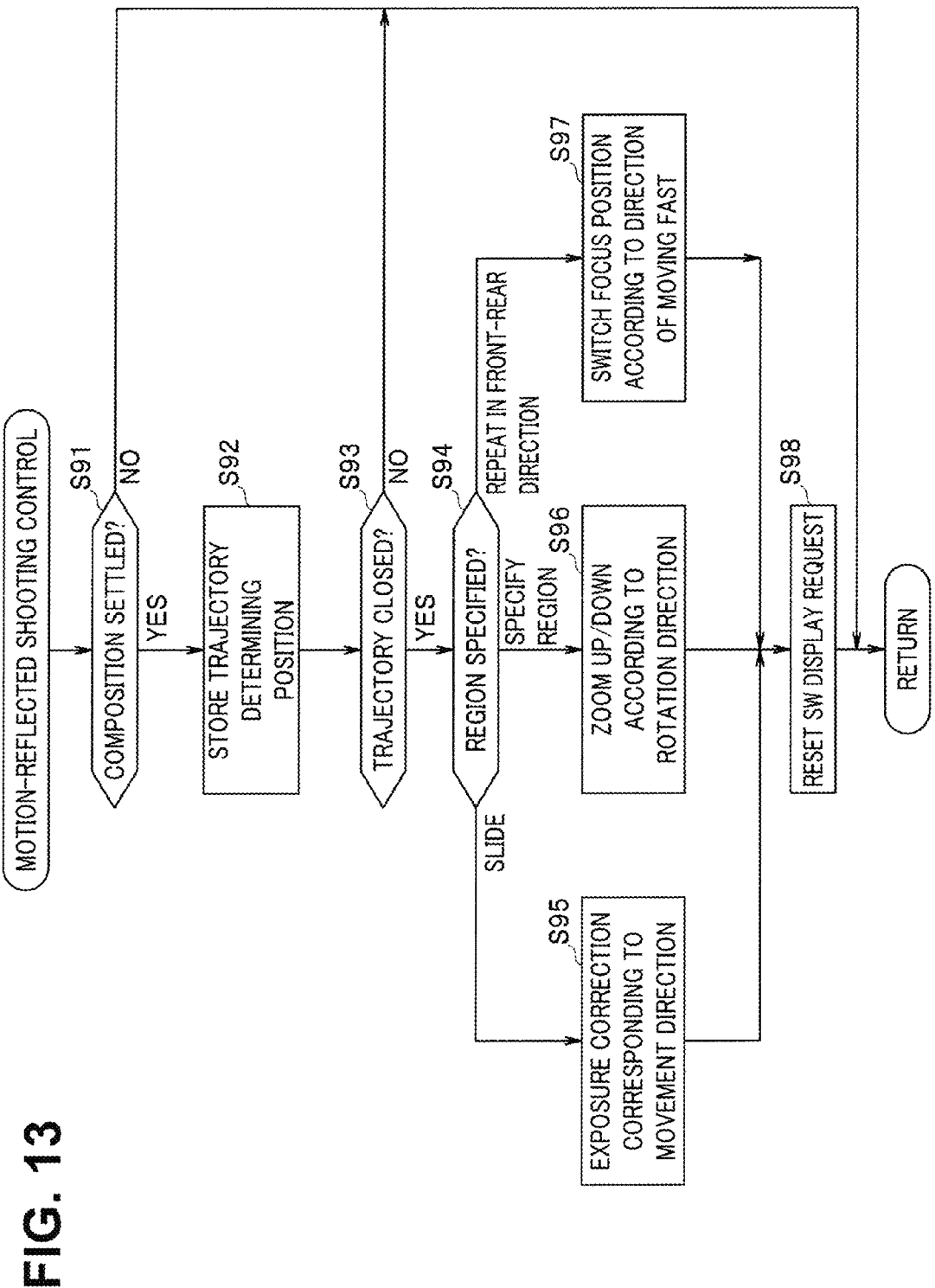
FIG. 13 is a flowchart illustrating an action of motion-reflected shooting control in step S40 in FIG. 7.

FIG. 12 is a flowchart illustrating an action of motion-reflected shooting control in step S20 in FIG. 7. Also, FIG. 13 is a flowchart illustrating an action of motion-reflected shooting control in step S40 in FIG. 7. Also, FIGS. 14A and 14B, and FIGS. 15A to 15E are explanatory views for explaining the shooting control corresponding to FIGS. 12 and 13.

Recently, automatic control of cameras has progressed, and exposure or focus other than a composition can be performed by cameras. Therefore, control of various image effects may be set to be performed according to the motions of the lens-style camera 51 and the smartphone 61 after the composition or the like is settled to some extent. FIG. 12 shows one example of an action flow of a case in which the control according to the motion is used for picture processing.

Figure 14A:
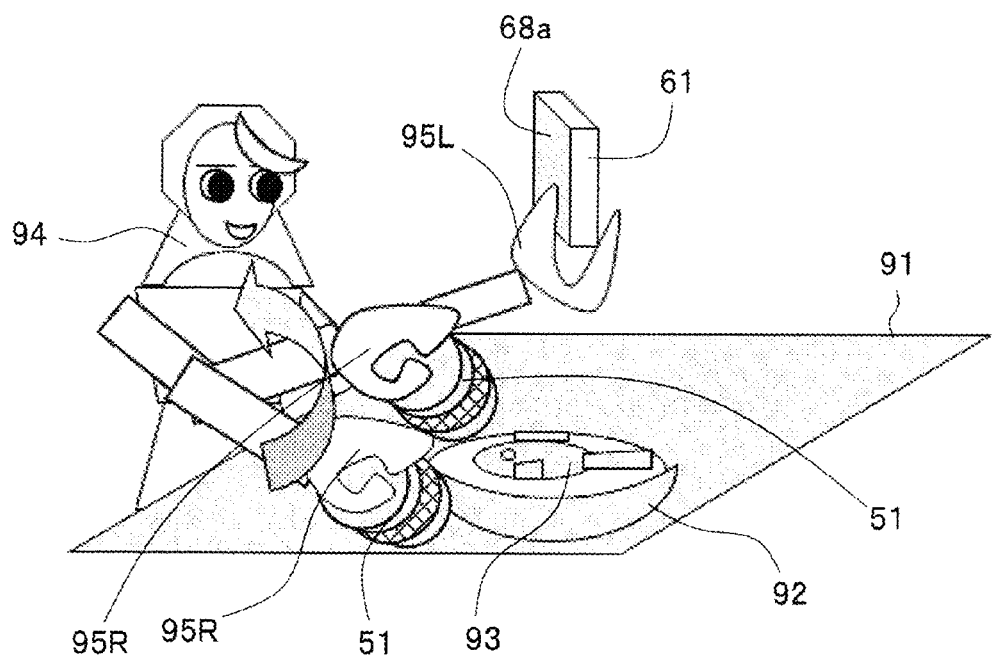
FIGS. 14A and 14B are explanatory views for explaining the shooting control corresponding to FIGS. 12 and 13.
Figure 14B:
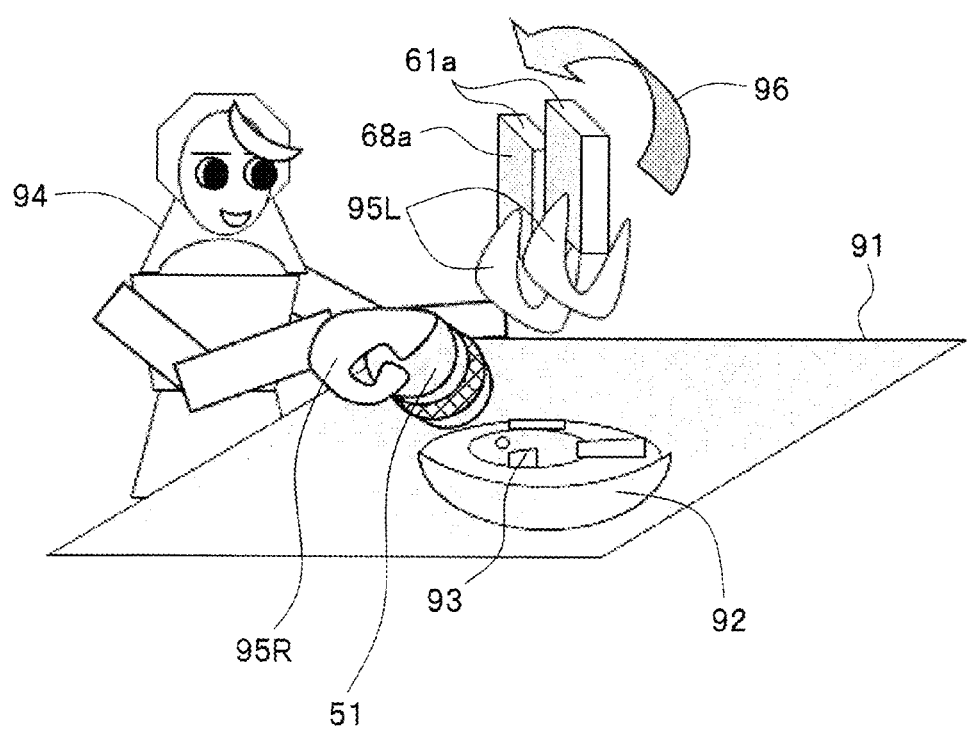

Since the lens-style camera 51 can be used separately from the smartphone 61, there is an advantage that a photographer does not need to move together with the lens-style camera 51 in order to decide a composition. In photograph shooting, it is important which object is arranged at which position in which size in a shooting range. Even when an object is aimed at from various angles by the lens-style camera 51, it is possible to confirm the effect if the smartphone 61 is held in front of eyes. Therefore, depending on a shooting scene, a significantly great advantage is obtained by separately using an image pickup section and an observation section for observing a picked-up image thereof. For example, when a dish is shot, a position of a photographer is limited in some cases, and it is extremely effective to use the image pickup section and the observation section in a separated state. FIGS. 14A and 14B show an example in which a dish is shot as described above. Note that hands, the lens-style camera 51, the smartphone 61, or the like are doubly illustrated to indicate a state in which the hands, the lens-style camera 51, and the smartphone 61 are moving in FIGS. 14A and 14B.

The control section 65 determines whether or not the composition is settled in step S71 in FIG. 12. For example, when the through image by the lens-style camera 51 is stable and a direction of the display screen 68a of the smartphone 61 is fixed, the control section 65 determines that the composition is already settled. Also, for example, when a predetermined time period has elapsed after the motion of the lens-style camera 51 is stopped based on the motion determination result of the motion determination section 57 of the lens-style camera 51, the control section 65 may determine that the composition is settled.

FIG. 14A shows a state in which the composition is decided. In the example in FIGS. 14A and 14B, a container 92 is put on a table 91, and a fish dish 93 is placed on the container 92. A user 94 grips the lens-style camera 51 with a right hand 95R, and grips the smartphone 61 with a left hand 95L. The user 94 decides the composition while moving the right hand 95R holding the lens-style camera 51, for example, as indicated by an arrow. The user 94 can confirm a through image displayed on the display screen 68a of the smartphone 61. The user 94 decides the composition by appropriately moving the right hand 95R while confirming the through image.

Figure 15A:
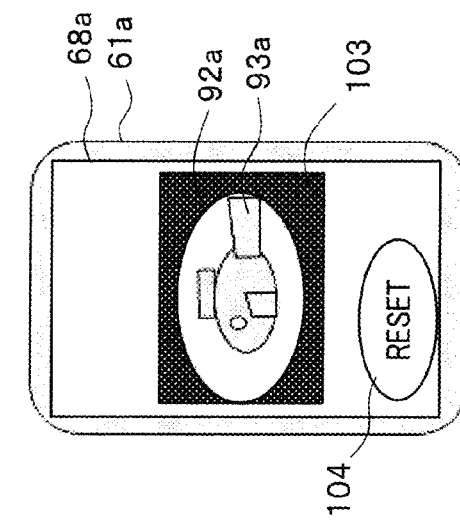

FIG. 15A shows the through image displayed on the display screen 68a of the display section 68 of the smartphone 61 when the composition is settled. As shown in FIG. 15A, a display region 101 for a through image is provided on the display screen 68a, and an image 92a corresponding to the container 92 and an image 93a corresponding to the fish dish 93 are displayed.

Figure 15B:
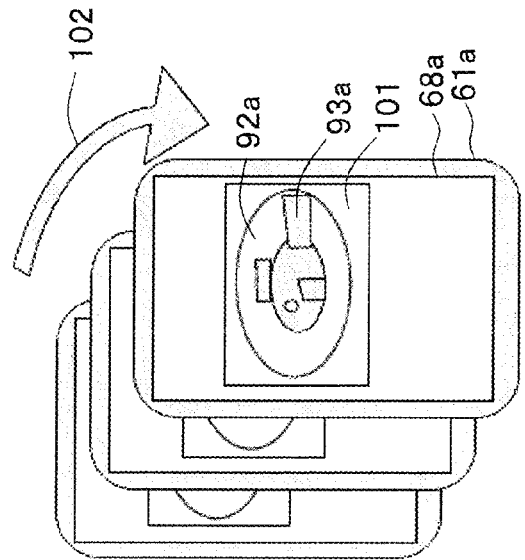
Figure 15C:
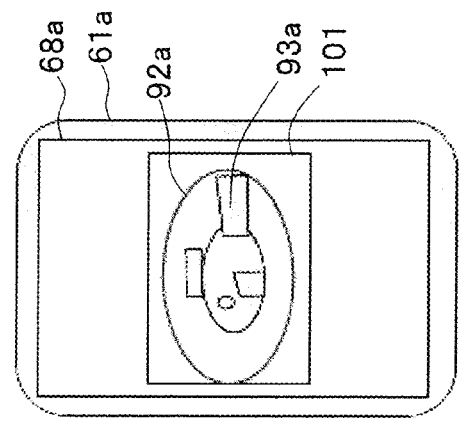

In the example in FIGS. 12 to 15A to 15E, image treatment for obscuring a periphery of the dish image 93a as shown in FIG. 15C is performed on the picked-up image shown in FIG. 15A by an operation of moving the smartphone 61 in a state in which the lens-style camera 51 is made stationary.

That is, the invention is featured in that the "composition deciding operation" (a hesitation action may be included therein) is determined by motion information of each of the image pickup section and the confirmation section, a user's intention is read from analysis of motion data by assuming that the user wants to perform a next operation when the image pickup section is fixed after the "composition deciding operation" is determined as described above, and the motion on the display side is used as input information of the user's intention.

The control section 65 stores a trajectory determining position in a memory (not shown) in order to decide a range of picture processing, e.g., a range of obscuring treatment in step S72. FIGS. 14B and 15B show that the user 94 rotates the left hand 95L after the composition is settled to perform an operation of rotating the housing 61a of the smartphone 61. The control section 65 determines whether or not the rotating operation by the user 94 returns to an original position, i.e., whether a trajectory is closed by obtaining a movement trajectory of the smartphone 61. When determining that the rotating operation by the user 94 returns to the original position, the control section 65 determines whether the determined trajectory indicates a region in a circular shape, an elliptical shape, a polygonal shape or the like, or indicates a linear movement in next step S74.

When the movement operation of the smartphone 61 by the user is a linear movement, the control section 65 advances the process to step S75, and requests the lens-style camera 51 to perform preset processing corresponding to a movement direction. The request is transmitted to the control section 53 of the lens-style camera 51 via the communication sections 62 and 55. When detecting that the request for picture processing is generated in step S38 in FIG. 7, the control section 53 of the lens-style camera 51 performs picture processing according to the request (step S39).

Note that it is obvious that all or part of each picture processing may be executed in the smartphone 61 although FIGS. 12 and 13 show the example in which various picture processing is executed in the lens-style camera 51.

When the movement operation of the smartphone 61 by the user is to specify a region, the control section 65 advances the process to step S76, and determines whether or not the region is specified for a first time. When the region is specified for the first time, the control section 65 requests the lens-style camera 51 to perform picture processing corresponding to a shape of the trajectory in step S77. The lens-style camera 51 executes the requested picture processing, and transfers an image as a result of execution to the smartphone 61. Accordingly, an image 103 after the picture processing as shown in FIG. 15C is displayed on the display screen 68a of the smartphone 61.

For example, the control section 65 employs an outer side or an inner side of the trajectory shape as a target of the picture processing by reflecting the trajectory shape. Note that the control section 65 may change the picture processing with respect to a normal direction of the trajectory. In the example in FIG. 15C, it is shown that obscuring treatment indicated by filling a space is applied to the periphery of the container image 92a by the user elliptically rotating the smartphone 61.

The control section 65 performs the picture processing in a shape similar to the actual trajectory formed by the user moving the smartphone 61. Actually, the user does not previously know which size trajectory the user should form so as to perform picture processing of a desired size, and thus, it is considered that the user decides a desired picture processing region by repeating a rotating movement while watching the image on the display screen 68a. FIG. 15D explains the rotating operation by the user as described above, and a trajectory 105 is formed by performing a rotating operation indicated by an arrow 102.

When determining that the region is specified for a second time or more in step S76, the control section 65 determines whether or not the region is changed in step S78. When the region is changed, the control section 65 requests the lens-style camera 51 to perform the picture processing in a region corresponding to a shape and a size of a new trajectory in step S79. For example, a request for picture processing by changing a boundary position, a size, a shape or the like of the picture processing is generated. The lens-style camera 51 executes the requested picture processing, and transfers an image as a result of execution to the smartphone 61. Accordingly, the corrected image 103 after the picture processing based on the new region is displayed on the display screen 68a of the smartphone 61.

Note that when there is no change in the region by the movement operation by the user in step S78, the control section 65 determines that the movement operation by the user is a request for changing a degree of the picture processing, and transmits a request for picture processing corresponding to the number of times of specifying the region to the lens-style camera 51 in step S80. For example, control is considered in which a density of the obscuring treatment is increased according to the number of times that the user performs the operation of specifying the region. The lens-style camera 51 executes the requested picture processing, and transfers an image as a result of execution to the smartphone 61. Accordingly, the image 103 after the picture processing, in which the degree of the picture processing is changed, is displayed on the display screen 68a of the smartphone 61.

Note that although the example in which the region of the picture processing is decided based on the trajectory by the rotating operation by the user is employed in FIG. 12, a specific picture processing region may be decided according to a particular motion of the user in consideration of a case in which it is not possible to set a picture processing region desired by the user due to a hand tremor or the like of the user.

In step S21 in FIG. 7, the control section 65 determines whether or not an instruction for shooting is performed by the user. When a shooting operation is performed, the control section 65 requests the lens-style camera 51 to shoot the image displayed on the display section 68 (step S22). The control section 53 of the lens-style camera 51 determines whether or not communication for instructing shooting is performed in step S41, and transfers the picked-up image or the image after the picture processing to the smartphone 61 according to an instruction from the control section 65 of the smartphone 61 (step S42). The control section 65 gives the picked-up image to the recording section 64 and records the image therein after performing signal processing on the picked-up image from the lens-style camera 51 (step S23).

The control section 65 displays a reset SW in step S81. FIG. 15C shows a state in which a reset SW 104 is displayed. The control section 65 determines whether or not the reset SW is operated in step S24 in FIG. 7. When the user touches a position of the reset SW 104, the control section 65 resets the detected trajectory, and transmits a request for resetting the picture processing to the lens-style camera 51 (step S25). When receiving the request for a resetting process in step S38, the lens-style camera 51 executes reset and transfers the original image before the picture processing to the smartphone 61. Accordingly, the image before the picture processing is displayed on the display screen 68a of the smartphone 61. When the motion of the smartphone 61 is stopped, the control section 65 transmits a notice indicating that the movement is stopped to the lens-style camera 51 in step S82.

Note that the control section 65 receives a reset display request from the lens-style camera 51 in step S83 when determining that the composition is not settled in step S71 and that the trajectory is not closed in step S73. As described later, the control section 53 of the lens-style camera 51 can independently execute picture processing according to a motion of the user without being controlled by the smartphone 61. In this case, the picture processing cannot be reset if the reset request is not received on the smartphone 61-side. Thus, the reset display request is received in step S83. When the reset display request is generated, the control section 65 displays the reset SW 104 in step S81.

Note that the motion determination section 69 can determine the motion with higher accuracy when using a motion determination result of the picked-up image from the built-in camera section 63, than using only the triaxial acceleration sensor or the gyro sensor etc. FIG. 15E is an explanatory view for explaining one example of a method of determining the motion. For example, the built-in camera section 63 of the smartphone 61 picks up an image of an object within a view area. FIG. 15E shows an example in which an image of a character string 106 is picked up as the object in order to simplify description. A left side of FIG. 15E shows that an image of a view area including a left end of the character string is picked up by the smartphone 61 as indicated by an arrow. In this case, an image of a character string 107 ("ABCD") is picked up. In contrast, a right side of FIG. 15E shows that an image of a view area including a center of the character string is picked up by the smartphone 61 as indicated by an arrow. In this case, an image of a character string 108 ("DEFGHI") is picked up. The control section 65 can recognize a movement direction of the smartphone 61 by a change in the picked-up image. Note that the image for motion determination does not need to be actually displayed on the display screen 68a.

The control section 53 of the lens-style camera 51 also determines whether or not shooting is instructed by an operation by the operation section 54 of the lens-style camera 51 (step S43). When shooting is instructed by the operation section 54, shooting is performed in step S44, and the picked-up image is recorded, for example, in the recording section 56 (step S45).

The control section 53 of the lens-style camera 51 can also independently perform picture processing without being controlled by the smartphone 61. The control section 53 performs the motion-reflected shooting control in step S40 when not receiving the picture processing request in step S38.

FIG. 13 shows the process in step S40. The control section 53 first determines whether or not the composition is settled in step S91 in FIG. 13. For example, the control section 53 may be given a control signal indicating that a composition deciding process is terminated from the smartphone 61, and thereby determine that the composition deciding process is terminated. Note that the control section 65 of the smartphone 61 can determine whether the motion of the lens-style camera 51 is a motion for deciding the composition or an operation after the composition is settled based on the motion determination result of the motion determination section 57 of the lens-style camera 51. For example, since the motion for deciding the composition is performed at relatively low speed, and a motion for the shooting operation after the composition is settled is performed at relatively high speed, the control section 65 can determine whether the motion is the motion for deciding the composition or the motion after the composition is settled.

The control section 53 of the lens-style camera 51 stores a trajectory determining position in a memory (not shown) in order to decide a range of picture processing in step S92. The control section 53 determines whether or not a rotating operation by the user 94 returns to an original position, i.e., whether a trajectory is closed by obtaining a movement trajectory of the lens-style camera 51 (step S93). When determining that the rotating operation by the user 94 returns to the original position, the control section 53 determines whether the determined trajectory indicates a region in a circular shape, an elliptical shape, a polygonal shape or the like, or indicates a linear movement in next step S94.

When the movement operation of the lens-style camera 51 by the user is a linear movement, the control section 53 advances the process to step S95, and performs preset processing corresponding to a movement direction, e.g., exposure correction according to the movement direction.

When the movement operation of the lens-style camera 51 by the user is to specify a region, the control section 53 advances the process to step S96, and controls zoom up/down according to a direction of the trajectory forming the region, e.g., a rotation direction.

Also, when determining that the movement operation of the lens-style camera 51 by the user is a repetitive movement in a front-rear direction, the control section 53 advances the process to step S97, and performs control to change a focus position according to a direction in which the user moves the lens-style camera 51 fast. The control section 53 transfers the image after the picture processing in steps S95 to S97 to the smartphone 61.

The control section 53 also transmits the display request for the reset SW to the smartphone 61 in step S98. When receiving the display request for the reset SW, the smartphone 61 displays the reset SW on the display screen 68a, and receives a reset operation by the user. Accordingly, it is possible for the smartphone 61 to reset the picture processing independently performed in the lens-style camera 51.

By the way, the example in which the connection determination is performed by a shake of the housing due to the motion, correspondence of the image features, detection of the image of the lens barrel or the like is employed in the description of FIG. 7. The example in which the picked-up image by the outer image pickup section of the built-in camera section 63 of the smartphone 61 is used for determining the image features is described. However, the picked-up image by the inner image pickup section of the built-in camera section 63 can be also used.

Figure 16:
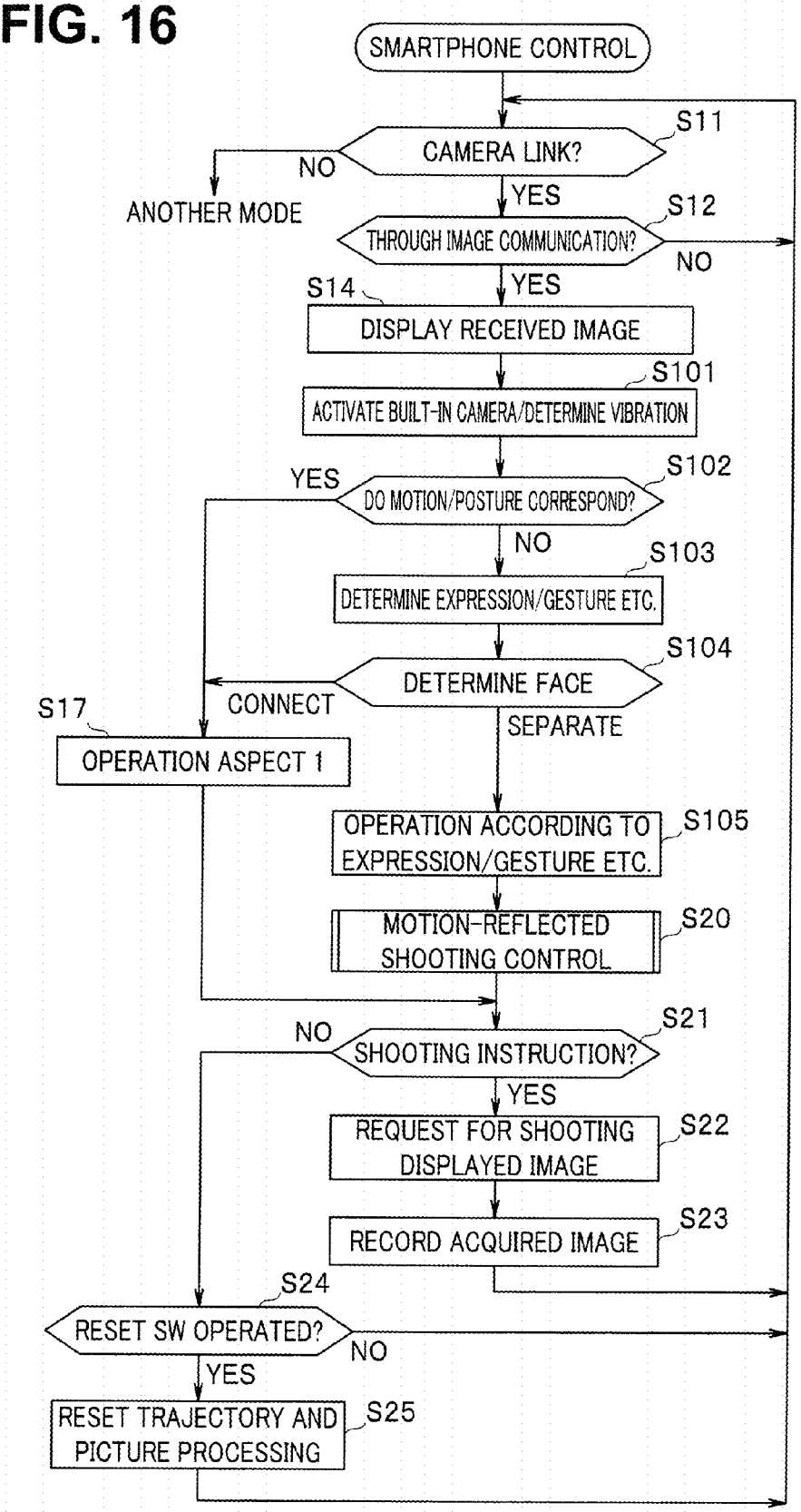
FIG. 16 is a flowchart illustrating an action flow in the control section 65 of the smartphone 61.

FIG. 16 is a flowchart illustrating an action flow in the control section 65 of the smartphone 61 in this case. In FIG. 16, same procedure steps as those in FIG. 7 are assigned same reference numerals, and a description thereof is omitted.

In step S101 in FIG. 16, the control section 65 activates the built-in camera section 63 and performs the vibration determination similarly to step S15 in FIG. 7. In this case, the control section 65 also activates the inner image pickup section in an example in FIG. 16. In step S102, the connection determination process similar to those in steps S16, S18, and S19 in FIG. 7 is performed. When determining that the lens-style camera 51 and the smartphone 61 are in a connected state by the determination, the control section 65 advances the process to step S17. When the control section 65 cannot determine that the lens-style camera 51 and the smartphone 61 are in a connected state, the control section 65 advances the process to step S103.

The control section 65 determines whether or not a person's face is taken in the picked-up image by the inner image pickup section, and determines an expression, a gesture, or the like when the person's face is taken in step S103. The control section 65 determines whether or not the lens-style camera 51 and the smartphone 61 are in a connected state by comparing a change in the face image picked up by the inner image pickup section and the picked-up image of the lens-style camera 51 in next step S104. For example, when there is no motion in the face in the image picked up by the inner image pickup section, and there is a motion in the picked-up image of the lens-style camera 51, the control section 65 determines that the lens-style camera 51 and the smartphone 61 are in a separated state. For example, when the user 94 is deciding the composition while watching the display screen 68a of the smartphone 61 during the composition deciding operation as in the example in FIG. 14A, the control section 65 can determine that the lens-style camera 51 and the smartphone 61 are in a separated state in step S104. When determining that the lens-style camera 51 and the smartphone 61 are in a connected state, the control section 65 advances the process to step S17. When determining that the lens-style camera 51 and the smartphone 61 are in a separated state, the control section 65 advances the process to step S105.

Subsequently, the control section 65 performs operation control according to the expression and the gesture in a determination result in step S105. For example, when detecting that the user has a gesture of closing one eye, the control section 65 performs processing corresponding to the gesture, e.g., determines whether the composition is settled. Also, when detecting a smiling expression of the user, the control section 65 may perform processing such as exposure control according to the expression. When the process in step S105 is terminated, the control section 65 executes the process in next step S20.

Note that although the example in which the determination of connection/separation and the operation control are performed based on the facial expression, the gesture, or the like of a person is employed in the example in FIG. 16, it is obvious that these controls may be performed by sound. Also, the determination using voice, the facial expression or the like may be performed only when the motion of the lens-style camera 51 is stopped.

As described above, in the present embodiment, the motions of the lens-style camera and the smartphone are determined, and the shooting control and the operation control are performed based on the relationship between the motions of the lens-style camera and the smartphone or the history of the motions. Accordingly, even when the lens-style camera and the smartphone are separated, and a user grips the housings thereof respectively with both hands, the user can surely perform an operation, and can freely decide a composition and perform shooting by a simple operation.

That is, the present invention provides an image pickup apparatus including: an image pickup section that picks up an image of an object; a confirmation section that is separate from the image pickup section and confirms a result of the image pickup; a composition deciding operation determination section (which is composed of a motion determination program) that determines a composition deciding operation by motion information of each of the image pickup section and the confirmation section; and an operation determination section (which is also composed of the motion determination program) that determines a particular motion of the confirmation section as an operation of changing an image pickup parameter when the image pickup section is substantially fixed after the composition deciding operation is determined It is thus possible to seamlessly decide the composition and control the image pickup parameter (including continuous shooting and image processing), and easily perform observation and shooting in a way a user wants.

Furthermore, the respective embodiments of the present invention have been described by using a lens-style camera as the device for shooting. However, a digital single lens reflex camera, a compact digital camera, a camera for a moving image such as a video camera and a movie camera, and a camera incorporated in a personal digital assistant (PDA) such as a mobile phone and a smartphone, may be of course employed as the camera. Also, an industrial or medical optical device such as an endoscope and a microscope, a surveillance camera, an on-vehicle camera, and a stationary camera such as a camera attached to a television receiver or a personal computer may be employed. Of course, the present invention can be used for an observation apparatus for observing a variety of things from various angles or an inspection apparatus. In inspection or observation, it is more convenient that a plurality of devices can be mechanically connected and separated, and a gripping method can be changed depending on an object. Thus, the present invention can be utilized in a wide range of fields.

The present invention is not directly limited to the above respective embodiments, and can be embodied by modifying constituent elements without departing from the scope in an execution phase. Also, various inventions can be formed by appropriately combining a plurality of constituent elements disclosed in the above respective embodiments. For example, some constituent elements out of all the constituent elements described in the embodiments may be deleted. Moreover, constituent elements in different embodiments may be appropriately combined.

Note that even though the description is made by using "first", "subsequently" or the like for the sake of convenience regarding the action flow in the claims, the specification, and the drawings, it does not mean that it is essential to perform the action flow in this order. It also goes without saying that respective steps constituting the action flow can be appropriately omitted regarding a portion not affecting the nature of the invention.

Also, the control or the function mainly described in the flowchart out of the techniques described herein can be mostly set by a program, and the control or the function described above can be achieved when a computer reads and executes the program. The program can be entirely or partly recorded or stored in a transportable medium such as a nonvolatile memory such as a flexible disk and a CD-ROM, and a storage medium such as a hard disk and a volatile memory as a computer program product. The program can be distributed or provided in product shipment or via the transportable medium or a communication line. A user can easily achieve the image pickup system and the image pickup method of the present embodiment by downloading the program via a communication network and installing the program in a computer, or installing the program in the computer from a recording medium.

What is claimed is:

1. An image pickup system in which an image pickup section and a confirmation section that displays a picked-up image from the image pickup section are separable, the image pickup system comprising:
    a first motion determination section that is capable of determining at least one or more types of motion states and a stationary state and determines which state the image pickup section is in concerning motion;
    a second motion determination section that is capable of determining at least one or more types of motion states and a stationary state and determines which state the confirmation section is in concerning motion; and
    a control section that controls at least one of the image pickup section and the confirmation section based on a combination of determination results of the first and second motion determination sections concerning motion of the image pickup section and concerning motion of the confirmation section.

2. The image pickup system according to claim 1,
    wherein the control section controls at least one of the image pickup section and the confirmation section based on a history of the relationship between the motion of the image pickup section and the motion of the confirmation section.

3. The image pickup system according to claim 2,
    wherein the control section determines that the motion of the image pickup section is an action of deciding a composition of image pickup by the image pickup section when the motion of the image pickup section is performed while the confirmation section is stationary.

4. The image pickup system according to claim 3,
    wherein the control section determines that the action of deciding a composition of image pickup is terminated when the motion of the image pickup section is stopped for a predetermined period.

5. The image pickup system according to claim 4,
    wherein the control section controls at least one of the image pickup section and the confirmation section based on the motion of the confirmation section after the action of deciding a composition is terminated.

6. The image pickup system according to claim 5,
    wherein when determining that a motion for forming a predetermined region is generated in the confirmation section after the action of deciding a composition is terminated, the control section controls picture processing by setting the region based on the motion of the confirmation section in the picked-up image.

7. The image pickup system according to claim 1,
    wherein the control section determines that the motion of the image pickup section is an action of deciding a composition of image pickup by the image pickup section when the motion of the image pickup section is performed while the confirmation section is stationary.

8. The image pickup system according to claim 7, wherein the control section determines that the action of deciding a composition of image pickup is terminated when the motion of the image pickup section is stopped for a predetermined period.

9. The image pickup system according to claim 8, wherein the control section controls at least one of the image pickup section and the confirmation section based on the motion of the confirmation section after the action of deciding a composition is terminated.

10. The image pickup system according to claim 9, wherein when determining that a motion for forming a predetermined region is generated in the confirmation section after the action of deciding a composition is terminated, the control section controls picture processing by setting the region based on the motion of the confirmation section in the picked-up image.

11. The image pickup system according to claim 1, wherein, responsive to a determination by one of the first and second motion determination sections of a stationary state and a determination by the other of the first and second motion determination sections of a motion state, the control section controls at least one of the image pickup section and the confirmation based on a type of motion state determined.

12. An image pickup system comprising:
an image pickup section that picks up an image of an object;
a confirmation section that is separate from the image pickup section and confirms a result of the image pickup;
a composition deciding operation determination section that determines a composition deciding operation by motion information of each of the image pickup section and the confirmation section; and
an operation determination section that determines a particular motion of the confirmation section as an operation of changing an image pickup parameter when the image pickup section is substantially fixed after the composition deciding operation is determined,
wherein the operation determination section determines whether or not the image pickup section and the confirmation section are connected, and
wherein the operation determination section determines a particular motion of the confirmation section as an operation of changing an image pickup parameter responsive to a determination that both (1) the image pickup section and the confirmation section are not determined to be connected and (2) the image pickup section is substantially not in motion after the composition deciding operation is determined.

13. An image pickup method comprising:
an image pickup step of picking up an image of an object by an image pickup section;
a confirmation step of confirming a result of the image pickup by a confirmation section that is separate from the image pickup section;
a composition deciding operation determination step of determining a composition deciding operation by motion information of each of the image pickup section and the confirmation section;
an operation determination step of determining a particular motion of the confirmation section as an operation of changing an image pickup parameter when the image pickup section is substantially fixed after the composition deciding operation is determined; and
determining whether or not the image pickup section and the confirmation section are connected,
wherein the operation determination step of determining a particular motion of the confirmation section as an operation of changing an image pickup parameter is performed responsive to a determination that both (1) the image pickup section is substantially not in motion after the composition deciding operation is determined, and (2) it is determined that the image pickup section and the confirmation section are not connected.

* * * * *